US010930244B2

(12) United States Patent
Croxford

(10) Patent No.: US 10,930,244 B2
(45) Date of Patent: Feb. 23, 2021

(54) DATA PROCESSING SYSTEMS

(71) Applicant: Apical Limited, Cambridge (GB)

(72) Inventor: Daren Croxford, Swaffham Prior (GB)

(73) Assignee: Apical Limited, Cambridge (GB)

( * ) Notice: Subject to any disclaimer, the term of this patent is extended or adjusted under 35 U.S.C. 154(b) by 0 days.

(21) Appl. No.: 16/279,863

(22) Filed: Feb. 19, 2019

(65) Prior Publication Data

US 2020/0265797 A1 Aug. 20, 2020

(51) Int. Cl.
*G09G 5/10* (2006.01)
*G06F 3/01* (2006.01)
*G09G 3/20* (2006.01)
*G09G 3/34* (2006.01)
*G09G 3/22* (2006.01)

(52) U.S. Cl.
CPC .............. *G09G 5/10* (2013.01); *G06F 3/013* (2013.01); *G09G 3/2003* (2013.01); *G09G 3/22* (2013.01); *G09G 3/3406* (2013.01); *G09G 2320/043* (2013.01); *G09G 2320/0666* (2013.01); *G09G 2320/0686* (2013.01); *G09G 2354/00* (2013.01)

(58) Field of Classification Search
CPC .......... G09G 5/10; G09G 3/2003; G09G 3/22; G09G 3/3406; G09G 2320/043; G09G 2320/0666; G09G 2320/0686; G09G 2354/00; G06F 3/013
See application file for complete search history.

(56) References Cited

U.S. PATENT DOCUMENTS

| | | | |
|---|---|---|---|
| 2011/0148940 A1* | 6/2011 | Byun | G09G 3/3426 345/690 |
| 2017/0038837 A1* | 2/2017 | Faaborg | G06F 3/011 |
| 2017/0236304 A1* | 8/2017 | Kempinski | G06F 3/013 382/117 |
| 2017/0308161 A1* | 10/2017 | Richards | G09G 3/3406 |
| 2018/0061117 A1* | 3/2018 | Pohl | H04N 13/117 |
| 2018/0158390 A1* | 6/2018 | Sanglimsuwan | G09G 3/003 |
| 2018/0247609 A1* | 8/2018 | Joshi | G09G 3/3426 |
| 2019/0146742 A1* | 5/2019 | Li | G06F 3/04883 345/11 |
| 2019/0179409 A1* | 6/2019 | Jones | G02B 27/0093 |

OTHER PUBLICATIONS

Carroll, et al., "Visual Field Testing: From One Medical Student to Another," University of Iowa, Eye Rounds, Aug. 22, 2013, available at: http://eyerounds.org/tutorials/VF-testing/.
"Rods, Cones, and the Fovea," Indiana University, Feb. 3, 2019, available at: http://www.indiana.edu/~p1013447/dictionary/rodcone.htm.

(Continued)

*Primary Examiner* — Charles V Hicks
(74) *Attorney, Agent, or Firm* — Vierra Magen Marcus LLP

(57) ABSTRACT

In a data processing system, when displaying frames to a user on a display, the location of the user's gaze on the display is determined, and the amount of light to be output for different regions of the display when displaying the frame on the display is selected and set based on the determined location of the user's gaze on the display.

10 Claims, 12 Drawing Sheets

(56) References Cited

OTHER PUBLICATIONS

Tobii Eye Tracker 4C—The Game-changing Eye Tracking Peripheral for Streaming, PC Gaming and Esports, by Tobii, Jun. 13, 2017, available at: https://www.amazon.com/Tobii-Eye-Tracker-Game-changing-Peripheral-Streaming/dp/B01MAWPMXQ/ref=sr_1_fkmr0_1?keywords=tobii+eye+tracker+4c+-+the+game-changing+eye+tracking+peripheral+for+streaming%2C+pc+gaming+%26+esports&qid=1554393542&s=gateway&sr=8-1-fkmr0.
Visual Sensitivity, York University, Apr. 3, 2019, available at: http://www.yorku.ca/eye/sensit.htm.
Wetzstein, "The Human Visual System," Stanford University, EE 267 Virtual Reality, Lecture 5, Jan. 2018, available at: https://www.coursehero.com/file/31863329/lecture5pdf/.
Blind spot (vision), WikipediA, Feb. 25, 2019, available at: https://en.wikipedia.org/wiki/Blind_spot_(vision).
Fovea centralis, WikipediA, Feb. 22, 2019, available at: https://en.wikipedia.org/wiki/Fovea_centralis.
Foveated rendering, WikipediA, Feb. 7, 2019, available at: https://en.wikipedia.org/wiki/Foveated_rendering.

\* cited by examiner

Left eye

Right eye

Image with left and right eye fovea and blind spot

Image with combined fovea region

Left image

Right image

Left eye

Right eye

Fovea region

Blind spot

Left image

Right image

DATA PROCESSING SYSTEMS

BACKGROUND

The technology described herein relates to data processing systems, and in particular to the operation of data processing systems that display images on a display.

FIG. 1 shows an exemplary data processing system 14 comprising a host processor comprising a central processing unit (CPU) 7, a graphics processing unit (GPU) 2, a video codec 1, an image signal processor (ISP) 13 (that is, e.g., in communication with a camera 12), a display processor (display processing unit (DPU)) 5, and a memory controller 8. As shown in FIG. 1 these units communicate via an interconnect 9 and have access to off-chip memory 3.

In this system the GPU 2, video codec 1, ISP 13 and/or CPU 7 will generate frames (images) to be displayed and the display processor 5 will then provide the frames to a display 4 for display. The display 4 may be local or remote to the remainder of the system, and may have a wired or wireless connection to the display processor 5.

In use of this system, an application such as game executing on the host processor (CPU) will, for example, require the display of frames on the display 4. To do this, the application 10 will submit appropriate commands and data to a driver 11 for the graphics processing unit 2 that is executing on the CPU 7. The driver 11 will then generate appropriate commands and data to cause the graphics processing unit 2 to render appropriate frames for display and to store those frames in appropriate frame buffers, e.g. in the main memory 3. The display processor 5 will then read those frames into a buffer for the display from where they are then read out and displayed on the display panel of the display 4.

The frames for display may also or instead be streamed to the display processor from the processing unit, e.g. the GPU 2 or ISP 13, that is producing the frames, e.g. through a cache, if desired.

An example of a use of a data processing system 14 such as that illustrated in FIG. 1 is to provide a so-called "XR" display, such as an augmented reality (AR) and/or virtual reality (VR), head-mounted display (HMD) system. (In this case, the display 4 will be a head-mounted display of some kind.)

The Applicants believe that there is scope for improved arrangements for displaying images to users of electronic devices, etc.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
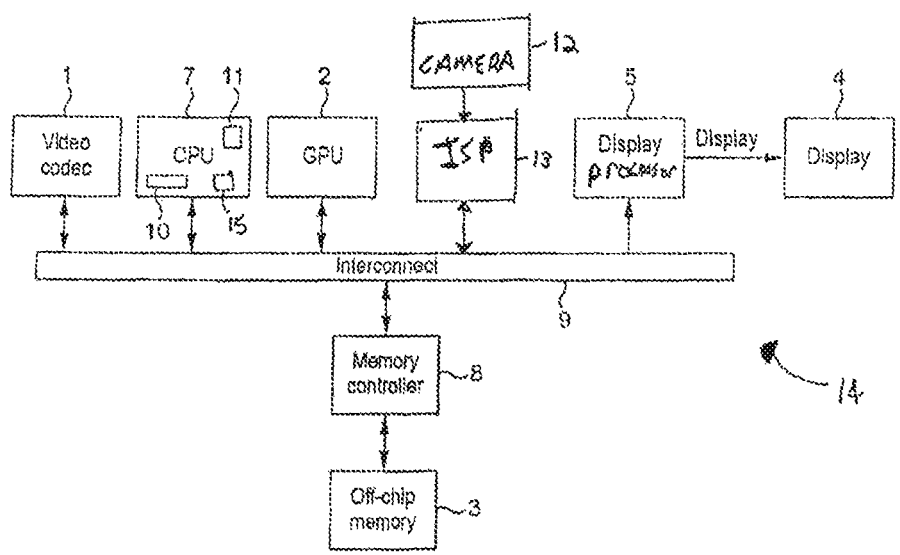
FIG. 1 shows an exemplary data processing system.

A first embodiment of the technology described herein comprises a method of operating a data processing system, the data processing system comprising:

a display operable to display frames to a user;

a producer processing unit operable to generate frames for display on the display;

a display processor operable to provide frames generated by the producer processing unit to the display for display; and a gaze tracking system operable to determine the location of a user's gaze on the display;

the method comprising:

when a frame is to be displayed on the display:

determining the location of the user's gaze on the display;

selecting the amount of a property of the light to be output for different regions of the display when displaying the frame on the display based on the determined location of the user's gaze on the display; and causing the display to output the selected amount of the property of the light in the different regions of the display when displaying the frame on the display.

A second embodiment of the technology described herein comprises a data processing system comprising:

a display operable to display frames to a user;

a producer processing unit operable to generate frames for display on the display;

a display processor operable to provide frames generated by the producer processing unit to the display for display; and a gaze tracking system operable to determine the location of a user's gaze on the display;

the data processing system further comprising a light output selection circuit configured to:

select the amount of a property of the light to be output for different regions of the display when displaying a frame on the display based on a determined location of the user's gaze on the display; and cause the display to output the selected amount of the property of the light in the different regions of the display when displaying a frame on the display.

The technology described herein relates to the display of frames (images) on a display in a data processing system.

In the technology described herein, when a frame is to be displayed on the display, the amount of a property (such as, and in an embodiment, and as will be discussed further below, the intensity and/or colour) of the light to be output for different regions of the display when displaying the frame is selected and set based on the location of the user's gaze on the display.

The Applicants have recognised in this regard that a user viewing a display will be (much) more sensitive to what is displayed in the region of the display that they are looking at (and in particular to the region of the display that is being gazed by the user's fovea), as compared to the region(s) of the display that are further away from that central, fovea, gaze region (that are in a "peripheral" region outside of the region gazed by the fovea). As such, reducing (e.g.) the light output in the peripheral region away from the fovea gaze region, for example, may not have a significant impact on the overall visual acceptability of the image from the user's perspective.

This may be particularly the case for head-mounted displays, for example, but can equally apply to other forms of display and electronic devices that incorporate a display.

Furthermore, the Applicants have recognised that a display is a significant source of power consumption in electronic devices that include displays. This may particularly be the case, for example, for lower powered and portable devices.

The technology described herein exploits this by tracking the gaze of the user on the display, and setting the light output for different regions of the display based on the location of the user's gaze on the display. For example, and in an embodiment, the intensity of light output can be reduced in regions of the display that are further away from the location of the user's gaze. This then enables the power that is consumed when displaying frames on the display to be reduced, but whilst still providing a visually acceptable display. This may also increase the lifetime of the display (as it will be producing a lower light output on average).

The producer processing unit that generates the frames for displaying on the display can comprise any processing unit of a data processing system that is capable of generating frames for display. Thus it may comprise, for example, a graphics processor (graphics processing unit (GPU)), a video processor/codec (video processing unit (VPU)), a CPU, and/or an image signal processor (ISP), etc. There may be more than one producer processing unit operable to generate frames for display on the display, if desired. In an embodiment, the producer processing unit is a graphics processor.

The frames that are generated for display can be any suitable and desired frames that it may be desirable to display. In an embodiment, the frames are frames that are generated for display for an application, such as a game, and in an embodiment for an augmented reality or virtual reality application. Each frame accordingly in an embodiment comprises an image to be displayed.

Each frame will comprise an array of data elements (sampling positions) (e.g. pixels), for each of which appropriate data (e.g. a set of colour values) is stored.

In one embodiment, the frames generated by the producer processing unit are stored, e.g. in a frame buffer, in memory, from where they are then read by the display processor for processing by the display processor (and then providing to the display for display). The frames could alternatively or additionally be streamed from the producer processing unit to the display processor, if desired.

The memory where the frames are stored (prior to processing by the display processor) may comprise any suitable memory and may be configured in any suitable and desired manner. For example, it may be a memory that is on-chip with the display processor, or it may be an external memory. In an embodiment it is in external memory, such as a main memory of the overall data processing system. It may be dedicated memory for this purpose, or it may be part of a memory that is used for other data as well.

The display processor can comprise any suitable and desired display processor that is operable to provide frames generated by a producer processing unit of a data processing system to a display for display. Thus the display processor should be operable to read data of frames from memory (and/or otherwise receive data of frames to be displayed), perform appropriate "display processing" on those frames, and then provide the processed frames to the display for display. In an embodiment, the display processor provides the frames to the display for display via a "direct" connection to the display, i.e. is operable to stream the frames (the data for the frames) to the display, rather than transferring the frames to the display via memory for example. The display processor may have a wired or wireless connection to the display.

The display processor accordingly in an embodiment includes an input stage operable to read and/or receive data of input frames (e.g. from memory where that data is stored), and an output stage operable to provide output frames to the display for display, e.g., and in an embodiment, as a stream of data elements (pixels) for display.

The display processor may also include other processing stages (units), if desired, such as a transformation stage that is operable to generate a view orientation transformed output frame using data of input frames, and/or a composition stage that is operable, inter alia, to composite plural input frames to provide an output frame for display.

The various stages of the display processor may be implemented as desired, e.g. in the form of one or more fixed-function circuits (hardware) (i.e. that is dedicated to one or more functions that cannot be changed), or as one or more programmable processing stages, e.g. by means of programmable circuits that can be programmed to perform the desired operation. There may be both fixed function and programmable circuits.

The display in the technology described herein can be any suitable and desired form of display, and can comprise any suitable and desired components and elements that a display may comprise, such as, and in an embodiment, a display panel, a display driver circuit for scanning frame data to the display panel, and a display receiver for receiving data to be displayed on the display panel. The display may also comprise appropriate local (on-chip) frame data storage, such as a frame buffer. The display may comprise the overall data processing system's (device's) local display (screen) and/or an external display. There may be more than one display output, if desired.

The display panel may be an emissive panel (i.e. in which each display element (pixel) generates its own, respective, light output), or a transmissive panel (i.e. in which the light is generated from a separate source to the display elements (pixels) themselves, such as a backlight).

In one embodiment, the display comprises a head-mounted display, e.g., and in an embodiment, for virtual reality and/or augmented reality display. In this case, the display should, and in an embodiment does, accordingly comprise a display panel (or panels) for displaying the frames to the user, and a lens or lenses through which the user will view the displayed frames.

The gaze tracking system operable to determine the location of a user's gaze on the display, and the determining of the location of a user's gaze on the display, can operate and be performed in any suitable and desired manner.

In an embodiment the gaze tracking is used to determine a "fixation point" (or points) on the display corresponding to the location of the user's gaze on the display. Where the display is being viewed by both eyes of the user, then in an embodiment a separate gaze location (fixation point) is determined for each eye). (This will be discussed further below.) In an embodiment a gaze location or locations (fixation point or points) that corresponds to the centre of the eye's retina (the fovea) is determined for each eye that is viewing the display (the frame) in question.

The gaze location or locations (fixation point or points) can be determined in any suitable and desired manner. In an embodiment this is based on, for example, the determined position of the centre of the user's eyes. It may also or instead (and in an embodiment also) be based on a sensed head position and/or orientation (the user's head orientation), and/or view direction, and/or a measure of the distance of the user's eyes from the display, and/or the current and/or relative position of the display.

In an embodiment, the gaze tracking system and the determining of the location of the user's gaze on the display at least performs some form of eye tracking (and comprises an eye tracking system) that is operable to determine the location of a user's gaze on the display. For example, an infra-red sensor could be used to determine the location of the user's pupils, or a more complex system, e.g., using image recognition (e.g. using a neural network) could be used to determine where the user's gaze is on the display. Head orientation information could also or instead be used for this, if desired.

In an embodiment, the gaze tracking system and process also or instead (and in an embodiment also) uses head tracking (head pose tracking).

Thus, in an embodiment, some form of eye tracking, in an embodiment in combination, if appropriate, with head tracking (head pose tracking), is used to identify where the user is looking at on the display.

Where head pose tracking is used, the head pose tracking data that is sampled and used in this regard can comprise any suitable and desired head pose tracking data. In an embodiment, it is data that is indicative of a view direction and/or position (and in an embodiment both), and in an embodiment tracks one or more of, and in an embodiment all of: head rotation and head translation.

The head pose tracking data can be determined as desired. For example, it could be generated by an appropriate sensor, such as an inertial measurement unit (IMU) that is associated with the display, a tracking system and/or a camera of the data processing system. In general, the sensed head pose data can be, and is in an embodiment, provided by a suitable system that can be queried at any point for a low latency, high accuracy source of head pose (in an embodiment rotation and position) data. The head pose tracking system could track rotation only, or rotation and position, or rotation and position and velocity, etc., as desired.

Thus, in an embodiment, the display has associated gaze location determining (e.g. eye tracking and/or head tracking) sensors and/or a camera or cameras, which, in an embodiment periodically, generate gaze tracking information, and are operable to provide that gaze tracking information, in an embodiment periodically, to appropriate processing unit(s) of the data processing system.

Thus, in an embodiment, the technology described herein comprises (and the data processing system is appropriately configured to) periodically sampling gaze tracking data (e.g., and in an embodiment, by means of appropriate sensors and/or a camera(s) of a, e.g. head-mounted, display that the display is part of), and using the sampled gaze tracking data to determine the location of the user's gaze on the display.

It would be possible in this regard simply to use as the determined location of the user's gaze on the display a location that is determined based on the current (or latest) gaze tracking information. However, in an embodiment, the latest sampled gaze tracking information is used to derive a predicted location (fixation point(s)) for the user's gaze on the display at the time when the frame will actually be displayed on the display. In this case, the sampled gaze tracking information could be, and is in an embodiment, used together with information about the time when the frame will be displayed, to determine as the location of user's gaze on the display, a predicted gaze location for the user during actual display of the frame.

The actual determination of the gaze location using the sensed gaze tracking data can be performed in and by any suitable and desired component or element of the data processing system. In one embodiment, the display processor receives the gaze tracking information and determines the user's gaze location(s). In another embodiment, this processing is carried out on the display itself (thus, the display receives the gaze tracking information and includes appropriate control circuitry (circuit) that then determines the user's gaze location(s)).

The tracking of the location of the user's gaze on the display can be used to select the amount of a property of the light to be output for different regions of the display when displaying a frame in any suitable and desired manner.

In an embodiment, the determined location of the user's gaze on the display is used to identify (at least) two regions on the display for which the amount of a property of the light to be output will be selected (and set), a first, "fovea" region on the display, which corresponds to the region on the display that will be gazed by the user's fovea, and a second, corresponding "peripheral" (non-fovea) region that surrounds the identified fovea region.

In the case where the frames are being displayed to both of the user's eyes on the same display (i.e. such that the user will be viewing a single frame with both eyes), then in an embodiment two fovea regions are determined based on the location of the user's gaze on the display, one for each eye. In this case therefore, there will be two fovea regions determined, and a peripheral region surrounding those fovea regions.

In the case where each eye is viewing a different frame (image) (such as will be the case for an XR head-mounted display, for example), then in an embodiment each displayed frame (i.e. the left and right displayed frames) is treated separately, and a single, respective, fovea region (and corresponding peripheral region) is identified for each frame of the pair of frames (based on the gaze location of the eye that is viewing that frame).

The fovea region on the display can be determined in any suitable and desired manner. In an embodiment, it is assumed to be a region that includes and (immediately) surrounds the location (the fixation point) of the user's gaze on the display.

In an embodiment, the fovea region is set to be a region having a particular, in an embodiment selected, and in an embodiment predetermined, shape (configuration) including and surrounding the determined location of the user's gaze (so including and surrounding the or each eye's determined fixation point), such as, and in an embodiment, a circular region.

The fovea region could be assumed to be, and set to be, a predetermined size (e.g. a circle having a predetermined radius). However, in an embodiment, the size of the fovea region is determined and set in use, e.g., and in an embodiment, based on a measure of the distance of the user (their eyes) from the display. In the case of a head mounted display, the distance of the user (their eyes) from the display may be preset (predefined), e.g., and in an embodiment, based on the known configuration of the display (when worn (in use)). For other displays, the distance of the user (their eyes) from the display may be determined in use, e.g., using eye tracking and/or head tracking information.

The shape (configuration) of the fovea region and its size (whether set as a predetermined size or determined based on the measure of the distance of the user (their eyes) from the display) can be determined in any suitable and desired manner. In an embodiment it is based on known properties of the physiology of the human eye, such as average fovea sizes and shapes (configurations), etc. It would also be possible, if desired, to perform some testing of a particular user to identify their fovea region(s) (e.g., and in an embodiment, the location, size, and/or shape of the user's fovea region(s)), if desired, and to then store that information for that particular user for use when displaying frames to that user in the manner of the technology described herein. Such user characteristics could be stored locally and/or remotely (e.g. in the "cloud") (and in the latter case then, e.g., also provided (e.g. downloaded) to other devices, if desired).

The "peripheral" (non-fovea) region in an embodiment comprises all the frame that is not determined to be the fovea region. Thus, the peripheral (non-fovea) region of the display is in an embodiment determined to be the remaining part of the display that is not the identified "fovea" region (or regions). Thus this will be a region that surrounds the identified fovea region or regions on the display.

Thus, in an embodiment, the determined location of the user's gaze on the display is used to determine a first (fovea) region that includes and surrounds the determined gaze location (and that in an embodiment has a predetermined shape, and a predetermined size or a size based on a measure of the distance of the user (their eyes) from the display), and a second (peripheral) region that surrounds the first (fovea) region (and that in an embodiment comprises some or all, and in one embodiment all, of the remainder of the display that isn't part of the first region).

In an embodiment, the tracking of the location of the user's gaze on the display is also or instead (and in an embodiment also) used to identify a blind spot region (or regions, in the case of both eyes viewing the same frame) for the user on the display (which should be, and is in an embodiment, the region of the display that is being gazed by the user's blind spot).

Again, the blind spot region could be set to a particular, in an embodiment selected, and in an embodiment predetermined, location (and shape (configuration) and size) on the display relative to the identified location of the user's gaze on the display (e.g., and in an embodiment based on known and typical locations, sizes, configurations, etc., of human users' blind spots), or it would also be possible, if desired, to perform some testing of a particular user to identify their particular blind spot region(s) (e.g., and in an embodiment, the location, size and/or shape of the user's blind spot region(s)), if desired, and to then store that information for use for that particular user when displaying frames to that user in the manner of the technology described herein.

The determination and use of a blind spot region (where the system supports that) is in an embodiment enabled in the case where each eye is viewing a different frame (image), but not in the case where both eyes are viewing the same frame (image) (as in that case each eye will have a different blind spot within the frame).

Thus, in an embodiment, the tracking of the location of the user's gaze on the display is used to identify and determine a fovea region for the user on the display and a peripheral (non-fovea) region for the user on the display. In one embodiment, the tracking of the location of the user's gaze on the display is also used to identify a blind spot region for the user on the display.

The amount of the property of the light to be output for the different regions of the display that are identified based on tracking the location of the user's gaze on the display can be selected and set as desired. The arrangement is in an embodiment such that a different amount of the property of the light is set to be output in each of the different regions.

The property of the light for which the amount to be output is selected and set for the different regions of the display that are identified based on tracking the location of the user's gaze on the display can be any suitable and desired property of the light to be output. In an embodiment, the property is one (or more) of: the intensity of the light to be output in the different regions; the luminance level of the light to be output in the different regions; the brightness of the light (image) to be output in the different regions; and the colour (e.g. the colour balance (relative amount of each different colour channel)) of the light to be output in the different regions. In one embodiment, only a single property of the light to be output is varied for the different regions. In other embodiments, two, or more than two, different properties of the light to be output are set and selected for the different regions of the display.

In the case where the intensity of the light to be output is set and selected (and varied) for the different regions of the display that are identified based on tracking the location of the user's gaze on the display, the arrangement is in an embodiment such that a different amount of light (a different light intensity) per unit area of the display is set to be output in each of the different regions.

In an embodiment the display is caused to output a relatively greater amount of light (a higher light intensity) (per unit area of the display) for one of the identified regions of the display compared to another region of the display. Thus, in an embodiment, the process will operate to identify two different regions of the display based on the tracking of the location of the user's gaze on the display, and will select a first, higher amount of light (intensity) to be output for a first of those regions of the display, and a second, lower amount of light (intensity) to be output, for the other of those regions of the display (in terms of the amount of light output (the light intensity) per unit area of the display). For example, and in an embodiment, a greater amount of light output (light intensity) (per unit area) is in an embodiment selected for the identified (fovea) region(s) that include and surround the gaze location(s) (fixation point(s)) on the display relative to the peripheral (non-fovea) region.

The different amounts of light to be output (light intensity) for the different regions of the display could be selected and set so that the overall amount of power consumed when displaying the frame will be the same as when simply displaying the frame in a conventional manner (i.e. without selecting different amounts of light to be output in different regions of the display in the manner of the technology described herein (i.e. such that the light output (intensity) per unit area is set to be the same for the entire display)).

In this case, the technology described herein could be used, for example, to adjust the distribution of the light output within an overall light output "budget" being used, for example, to provide greater light output (intensity) (and use a greater proportion of the overall power consumption budget for the display) in the region or regions (e.g., and in an embodiment the fovea region(s)) of the display where the light output is likely to provide the greater visual effect (and correspondingly to use less of the overall light output "budget" in those regions (such as, and in an embodiment, the peripheral region), where a reduced light output (intensity) will have lesser visual effect).

In this case, the light output (intensity) in the fovea region could be, in effect, "boosted" relative to the light output (intensity) when simply displaying the frame in a conventional manner, with the light output (intensity) in the peripheral region being correspondingly reduced relative to when simply displaying the frame in a conventional manner.

However, in an embodiment, the amount of light to be output (the light intensity) for the different regions of the display is selected and set so as to reduce the overall amount of light that is output (and thus the power consumption) when displaying the frame, relative to the amount of light output (and the amount of power that would be consumed) when displaying the frame without selecting the amount of light to be output (the light intensity) for different regions of the frame based on the tracking of the location of the user's gaze on the display. In this way, the technology described herein can be used to reduce the power consumed when displaying frames on the display.

In this case, the amount of light to be output (the light intensity) that is selected and set for one identified region of the display (and in an embodiment for the fovea region(s) on the display) could still be set to be greater than the light output (intensity) that would normally be provided for that region based on the frame data (pixels) that are to be displayed in that region, with the amount of light to be output (the light intensity) for another region (and in an embodiment for the peripheral (non-fovea) region) then being reduced relative to the light output that would normally be provided for that region, such that the amount of light that will be output when displaying the frame is reduced overall.

However, in an embodiment, the amount of light to be output (the light intensity) that is selected and set for one identified region of the display (and in an embodiment for the fovea region on the display) is set to be the light output (the light intensity) that would normally be provided for that region based on the frame data (pixels) that are to be displayed in that region, but the (in an embodiment maximum) amount of light to be output (the light intensity) for another region (and in an embodiment for the peripheral (non-fovea) region) is reduced (relative to the (maximum) light output that would normally be provided for that region, thereby (potentially and typically) reducing the overall amount of light that will be output when displaying the frame.

Thus, in an embodiment, selecting and setting the amount of a property of the light to be output for the different regions of the display comprises, for at least one region of the display, modifying the amount of light to be output (the light intensity) for that region of the display from the amount of light (the light intensity) that would be output for that region of the display based on the generated frame to be displayed. In an embodiment the amount of light output (the light intensity) for the region of the display is set to a reduced level relative to the amount of light (the light intensity) that would be output based on the generated frame. This is in an embodiment done at least in the case of the identified peripheral region on the display.

Corresponding arrangements can, and in an embodiment are, used when setting and selecting the amount of other properties of the light to be output in the different regions on the display.

For example, in the case of luminance, the luminance of the light to be output that is selected for one identified region of the display (and in an embodiment for the fovea region on the display) could be, and is in an embodiment, set to be the luminance that would normally be provided for that region based on the frame data (pixels) that are to be displayed in that region (or a "boosted" luminance for that region), but the luminance of the light to be output for another region (and in an embodiment for the peripheral (non-fovea) region) could be, and is in an embodiment, reduced (relative to the luminance that would normally (otherwise) be provided for that region).

For example, and in an embodiment, the maximum luminance level displayed for the peripheral region could be lowered and/or capped at a particular, in an embodiment selected, in an embodiment predetermined, threshold luminance level, that may be, and is in an embodiment, based upon a known, threshold amount of luminance at which the user's eyes' peripheral region will saturate (will no longer be able to perceive any difference in luminance above that threshold) (as the peripheral region of a user's eye will be less able to distinguish between higher luminance levels (as the receptors in the eye will saturate at a lower level), such that the maximum luminance level generated for the peripheral region can be lowered without affecting perceived image quality).

In the case of colour, the colour of the light to be output that is selected for one identified region of the display (and in an embodiment for the fovea region on the display) could be, and is in an embodiment, set to be the colour that would normally be provided for that region based on the frame data (pixels) that are to be displayed in that region, but the colour of the light to be output for another region (and in an embodiment for the peripheral (non-fovea) region) could be, and is in an embodiment, reduced (relative to the colour that would normally (otherwise) be provided for that region).

For example, and in an embodiment, the (maximum) colour range displayed for the peripheral region could be lowered and/or capped at a particular, in an embodiment selected, in an embodiment predetermined, threshold colour range, that may be, and is in an embodiment, based upon a known, threshold amount of colour range at which the user's eyes' peripheral region will saturate (will no longer be able to perceive any difference in colour range above that threshold) (as the peripheral region of a user's eye will be less able to distinguish between different colours (as the receptors in the eye have lower colour sensitivity)).

In the case where the property of the light that is selected and set for the different regions of the display is the colour of the light that is output, the process could operate to vary the colour output uniformly across each colour channel (e.g. generally to boost, maintain, or reduce the displayed colour range), and/or could relatively reduce and/or boost and/or maintain different colour channels (relative to each other). For example, the (relative) colour balance in a region could be selected and set, e.g. to modify the colour balance from the colour balance that would normally be provided for that region based on the frame data (pixels) that are to be displayed in that region (and in one embodiment, this is done). In this case a colour channel or channels could simply be disabled, and/or the relative outputs of the different colour channels could be modified.

For example, in the case of the peripheral region, the colours could be biased towards a grayscale display (and/or set simply to a grayscale display), as the eye may have less sensitivity to colour in those regions).

The selected amount of the property or properties of the light to be output for a region of the display can comprise any suitable and desired amount of the property of the light. This may be, and is in an embodiment, based on known properties, such as, and in an embodiment, the sensitivity to luminance and/or colours, of different regions of the human eye (and/or of the specific user's eye).

In an embodiment, where a reduced amount of a property of the light is to be output for a region of the display (such as, and in an embodiment, in the case of a peripheral region), that reduced amount of the property of the light may be, and in an embodiment is, based on (e.g. corresponds to) a particular, in an embodiment selected, in an embodiment predetermined, threshold amount of the property of the light (e.g. the intensity or luminance). Such a threshold amount may be, and is in an embodiment, based upon a known, threshold amount of the light property (e.g. luminance) at which the user's eyes' (e.g. peripheral region) will saturate (will no longer be able to perceive any increase in light output above that threshold). In this case, the property of the light could simply be set to the threshold (saturation) level, or could be capped at that level, as desired.

In the case where a blind spot region for the user is identified and used, then the light output for that identified blind spot region should be, and is in an embodiment, selected to be a reduced amount of light output (e.g. intensity, and/or colour range) relative to the other regions of the display. In an embodiment, the light output for a blind spot region is set to zero (i.e. such that the display is controlled to not output any light in the identified blind spot region).

The determination and selection of the amount of the property of the light to be output for different regions of the display based on the tracking of the location of the user's gaze on the display can be performed by any suitable and desired component and element of the data processing system. This may depend, for example, on which component or components of the data processing system receives the gaze tracking data.

In one embodiment, the display processor operates to select and set the amount of the property of the light to be output for different regions of the display based on the gaze tracking.

In another embodiment, this is done by (on) the display itself (and the display correspondingly in an embodiment includes a suitable control circuit (circuitry) that is operable to, and configured to, select (and cause to be output) an amount of a property or properties of the light to be output for different regions of the display based on the tracking of the location of a user's gaze on the display).

Once the amount of a property or properties of the light to be output for different regions of the display has been selected based on the tracking of the location of the user's gaze on the display, the display is caused to output the selected amount of the property of properties of the light for the different regions of the display when displaying the frame on the display. The display can be caused to output the selected amount of the property or properties of the light in each different region of the display in any suitable and desired manner. This may, and in an embodiment does, depend upon the nature of the display (and in particular of the display panel of the display).

In the case of an emissive display, i.e. a display having an emissive display panel, such as an organic LED (OLED) or micro LED panel, in which light is generated by each picture element (pixel) of the panel, the light output by the display when displaying the frame is in an embodiment controlled by modifying the colour values to be displayed at each pixel of the display so as to cause the display to output the selected amount of the property or properties of the light in the different regions of the display. Thus, in this case, the initially generated colour values to be used for each pixel of the display when displaying the frame will be modified (changed) to cause the display to output the selected amount of light in the different regions of the display. In this case therefore, the generated colours for the frame will be modified to control the amount of the property or properties of the light that is output by the display.

In this case, the colours of the pixels can be modified in any suitable and desired manner. The pixel colour values are in an embodiment modified to modify (change) (i.e. reduce or increase, as desired) the luminance and/or colour range at the pixels in question.

This could be done, for example, by modifying the different colour values (channels) for a pixel in a uniform manner (e.g. such that each colour value will be modified by the same (relative) amounts, such as a 10% (or other percentage) reduction in the value, for example).

However, in an embodiment, the colours of the pixels to be displayed are modified by modifying respective different colour channels for the pixels relatively differently to each other.

For example, and in an embodiment, in the case where the emissive display includes a "white" colour channel (each pixel has a "white" sub-pixel), then the value of that white "colour" channel (sub-pixel) could be relatively increased, with the values of the other colour channels (sub-pixels) being relatively decreased, so as to reduce the overall amount (intensity) of light that is output, but whilst maintaining a relatively higher apparent brightness in that region.

Thus, in an embodiment, in the case where an emissive display includes for each pixel a "white" colour channel (together with RGB colour channels), then the value of the "white" colour channel could be, and is in an embodiment, relatively increased, with the values of the other colour channels being relatively decreased, so as to reduce the overall amount of light (intensity) that is output, whilst maintaining a relatively higher apparent brightness and luminance for the pixel in question.

Correspondingly, in an embodiment, in the case where the light output for a pixel is to be reduced (e.g. because the pixel lies within the determined peripheral region for the user's current gaze location), then the pixel colour to be displayed (i.e. that will drive the pixel in the emissive display) is in an embodiment modified so as to relatively favour light output in terms of the luminance of the pixel, at the expense of any chrominance (colour) output for the pixel, such that the overall output from the pixel and thus the power consumed by the pixel when displaying the frame is reduced. For example, and in an embodiment, the pixel colour could be biased towards (or set to be) a grayscale, so as to display, in effect, only the relative luminance component of the pixel without also driving the pixel to present any chrominance component to the user.

In general, in the peripheral region, the user will have less colour sensitivity, and so the colour values can be modified to focus mainly on luminance (the RGB values can be modified to boost the luminance (at the expense of colour) and/or just the white colour channel (where available) could be driven to provide an output). For example, the peripheral region may only be able to tell the difference between 4,4,4 (grey white) and maximum black (0,0,0) whereas the fovea region may be able to differentiate the whole range of colours between 255,255,255 maximum white and maximum black (0,0,0).

Similarly, the peripheral region may have a narrower sensitivity range and be unable to tell the difference between medium and high intensity values, such that the intensity at the peripheral region can be reduced without the user noticing. In particular, the peripheral region may saturate at a low luminance, such that the user cannot distinguish the difference between medium intensity and high intensity in the peripheral region, such that for the peripheral region the light intensity can be capped to a saturation value above which any luminance difference cannot be perceived.

Where a blind spot region is also identified and used, then the pixels in the blind spot region can simply be disabled so as to generate no light output at all.

In emissive display arrangements, the pixel colour values provided to the display for displaying the frame can be modified from the pixel values initially generated for the frame by any suitable and desired component of the data processing system. In one embodiment, this is done by the display processor, before the frame is provided to the display for display. In other embodiments, the pixel colours for the frame provided by the display processor to the display for display are modified on the display itself for this purpose, before the frame is displayed.

In the case of an emissive display, the pixel values can be adjusted in dependence on the region the pixels fall within as desired. In an embodiment, it is determined for each individual pixel in the display which identified region of the display (e.g. the fovea region or the peripheral region) the pixel falls within, with the pixel colour values then being set (and, e.g., modified) accordingly.

This could also be done at the resolution of blocks of plural pixels, if desired. In this case, if any part of a block of pixels falls within the fovea region, for example, then the entire block is in an embodiment considered to be within that region (and the pixel values set accordingly). Correspondingly, for a block of plural pixels to be considered to be within the periphery region, in an embodiment the entire block of pixels has to be within the periphery region (and similarly for a blind spot region if that is being considered).

In the case of a transmissive display, such as an LCD, LED-LCD or QLED display, in which the light for the display is generated from a backlight (rather than by each pixel of the display panel itself), then the amount of the property or properties of the light output for different regions of the display can be, and is in an embodiment, controlled by controlling the back light output for respective different regions of the display. In this case, the display should be such that the backlight output can be different for different regions of the display, and the technology described herein will then operate to vary the amount of backlight output for the different regions of the display based on the tracking of the location of the user's gaze on the display. In this case, the backlight output is in an embodiment used to control and set the intensity of the light that is being displayed.

Thus, in an embodiment, the display is a transmissive display, and the display is caused to output the selected amount of the property (and in an embodiment the intensity) of the light for different regions of the display when displaying the frame on the display by varying (and setting) the backlight output for the different regions of the display.

The backlight output can be controlled in any suitable and desired manner. In an embodiment the intensity of the backlight is controlled (and set), e.g., and in an embodiment, reduced and/or turned off, for this purpose. For example, and in an embodiment, in the blind spot region, the backlight can be, and is in an embodiment, simply turned off. In the peripheral region, the maximum backlight level (intensity) is in an embodiment set to (and capped at) a predetermined threshold "saturation" level (as discussed above).

In these embodiments, the backlight output (intensity) can be controlled by any suitable and desired component and stage of the overall data processing system. For example, where the display processor also sets the backlight output, then the display processor could operate to control the backlight output (intensity) for the different regions of the display accordingly. Correspondingly, in the case where the display itself includes a suitable backlight output (intensity) control, then that backlight output (intensity) control on the display itself could equally be, and is in an embodiment, used to control the backlight output (intensity) when operating in the manner of the technology described herein.

In this arrangement, in an embodiment, for any region (e.g. the peripheral region) of the display where a reduced backlight output (intensity) is to be provided, the colour values to be provided to the pixels in that display region can be, and are in an embodiment, modified to relatively increase their luminance (compared to the original, generated colour values). This will then allow a lower backlight level to be used whilst still achieving a desired luminance level.

Thus, in an embodiment, in the case of a transmissive display at least, in a region, such as a peripheral region, for which a reduced light output is selected, the light output (e.g. backlight) intensity is reduced for that region, and the colours to be displayed in that region are modified so as to increase their (relative) luminance.

In this case, the colours to be displayed can again be modified by any suitable and desired component stage of the data processing system, such as by the display processor or by (on) the display itself (as discussed above).

In the case of a transmissive display, the light output can be adjusted in dependence on the identified region of the display as desired. In an embodiment, it is determined for each region of the display for which the backlight output (intensity) can be independently controlled, which identified region of the display (e.g. the fovea region or the peripheral region) the backlight "region" falls within, with the backlight output for the different backlight regions then being set (and, e.g., modified) accordingly.

In this case, if any part of an independently settable (controllable) backlight region falls within the fovea region, for example, then the entire backlight region is in an embodiment considered to be within that fovea region (and the backlight output for the region set accordingly). Correspondingly, for an independently settable (controllable) backlight region to be considered to be within the periphery region, in an embodiment the entire independently settable (controllable) backlight region has to be within the periphery region (and similarly for a blind spot region if that is being considered).

In the case where the tracking of the user's gaze is used to identify a blind spot region for the user on the display and the amount of light to be output for that blind spot region is selected to be zero, then for a transmissive display the backlight can simply be disabled (switched off) in the blind spot region (where it is possible to do that).

Correspondingly, in the case of an emissive display, the colours to be displayed in the blind spot region can simply be set to be "black" so as to reduce or omit the light output in the blind spot region. This will then mean that the pixels are not driven to provide an output in the blind spot region.

It would also be possible, if desired, to identify when both the user's eyes are viewing the same frame (using the gaze tracking), and to then disable any blind spot region determination and use in that event, if desired.

As well as selecting the amount of a property or properties of the light to be output for different regions of the display based on the tracking of the location of the user's gaze on the display, in an embodiment, the technology described herein also uses other information and data when selecting and to select the amount of a property or properties of the light to be output for different regions of the display.

Such additional information could be any suitable and desired information which the amount of a property or properties of the light to be output could be selected.

In one embodiment, this information is information that is indicative of, and that relates to, the environment in which the display is being used, such as, and in an embodiment, a measure of the ambient light falling on the display. In this case, the ambient light could, for example, be determined using an appropriate ambient light sensor of the display and/or of the electronic device that the display is part of.

The selecting of the amount of a property or properties of the light to be output for different regions of the display could also (and does in an embodiment) take account of (and is based on) (any) lens distortions introduced by any lenses that the user is viewing the display through. For example, head-mounted displays, e.g. for virtual reality applications, typically use lenses that feature severe pin-cushion distortion. This pin-cushion distortion can be corrected by passing the image to be displayed through a barrel distortion. The effect of this is that the image towards the centre of the display (for each eye) is magnified whereas the peripheral area is minified. The effect of this then is that the peripheral area can be displayed at a lower light output than the central, magnified area, without any significant loss in the overall visual effect for the user.

In an embodiment, the amount of a property or properties of the light to be output for different regions of the display is also selected and set based on (information indicative of, and relating to) the sensitivity of the user to a property or properties of light, and, in particular, and in an embodiment, based on the sensitivity of the user to colour (e.g., and in an embodiment, whether, and if so how, the user is colour blind).

In an embodiment, the property or properties of the light to be output for different regions of the display is based on (information relating to and/or a measure of) the colour sensitivity (e.g. blindness) of the user. In this case, the particular property of the light to be output that is set and selected based on the user's colour sensitivity (blindness) is the colour of the light that is output (and, e.g., and in an embodiment, the (relative) amounts of a particular colour channel or channels that are output and/or disabled when displaying the frame).

For example, where a user has a reduced or no sensitivity to a particular colour or colours (e.g. red, green and/or blue), then that colour channel or channels output could be, and is in an embodiment, reduced or omitted entirely.

Correspondingly, where the user sees no colour at all, then the display of the frame could be, and is in an embodiment, modified so as to output a monochromatic image. In the case where the display has a white pixel, this could be performed by just using the white pixel. Alternatively, the RGB colour to be displayed could be converted to a luminance level so as to output the appropriate RGB luminance level, but without, and/or with reduced, colour information.

Such colour adjustment could be done only for one region on the display (e.g., and in an embodiment, for the peripheral region), but in an embodiment is done for both the peripheral and fovea regions (for all regions of the display (except for, e.g., any blind spot region where no light is being output)).

In these embodiments, the user's colour sensitivity could be set and determined as desired. For example, the user could be asked to input information relating to their colour sensitivity. In an embodiment, the user's colour sensitivity is determined by performing some form of testing of the particular user to determine a measure of their colour sensitivity, with that colour sensitivity information then being stored for that particular user for use when displaying frames to that user in the manner of the technology described herein. Such user colour sensitivity characteristics could again be stored locally and/or remotely (and again also provided to and used for other devices, if desired).

It will be appreciated in this regard that in general the display of frames on the display may be, and is in an embodiment, based on information about the user's visual sensitivity (eye characteristics), such as, and in an embodiment, one or more of: the location, shape, and/or size of their fovea region and/or blind spot; their light sensitivity; and their colour sensitivity (e.g. colour blindness). In embodiments these properties are measured or determined, e.g. in use, for a given user, and then stored and used to adjust the display output (whether on the same or different or plural devices (for that user)), as desired. Thus in general, the amount of a property or properties of the light to be output when displaying a frame on the display (and in an embodiment for different regions of the display when displaying the frame on the display) are selected and set based on the visual sensitivity (eye characteristics) of a user.

In such arrangements, the user's visual sensitivity (such as one or more, in an embodiment plural, and in an embodiment all, of: their fovea region, blind spot region, colour sensitivity (colour blindness), etc.) can be determined in any suitable and desired manner, using any suitable and desired methods. The user's visual sensitivity information is in an embodiment then stored, and, in an embodiment, made available to other devices that the user has, for example via and using remote storage (e.g. the Cloud).

In such arrangements, the device that the user is using would in an embodiment then be operable to detect or determine the identity of the user, and then, if a known user is using the device, fetch that user's visual sensitivity characteristics, and configure (optimise) the display of images accordingly. The user could be identified automatically by the device, for example using some form of facial recognition process, and/or the user could be required to identify themselves to the device, such as by the device requesting user identifying information, such as an identity and/or a password/code, for the user. For example, the user could be required to login to the device. The device would then use the visual sensitivity characteristics of the user to configure the display of images to that user.

The Applicants have further recognised that while such arrangements which modify the displaying of frames on the display based on a user's visual sensitivity (characteristics) may, and in an embodiment do, also identify and use the location of the user's gaze on the display (as discussed above), it would be possible to improve the display of images based on the user's visual characteristics without also using gaze tracking, if desired. For example, the display of images on the display could still take account of a user's colour sensitivity (colour blindness), even if gaze tracking is not being done.

The Applicants accordingly believe that the modification of the display of images to a user based on the user's visual sensitivity, irrespective of whether gaze tracking is used, may be new and inventive in its own right.

Thus, another embodiment of the technology described herein comprises a method of operating a data processing system, the data processing system comprising:

a display operable to display frames to a user;

a producer processing unit operable to generate frames for display on the display; and a display processor operable to provide frames generated by the producer processing unit to the display for display;

the method comprising:

when a frame is to be displayed on the display:

determining a visual characteristic of a user viewing the frame on the display;

selecting the amount of a property of the light to be output when displaying the frame on the display based on the determined visual characteristic of the user viewing the frame on the display; and causing the display to output the selected amount of the property of the light when displaying the frame on the display.

Another embodiment of the technology described herein comprises a data processing system comprising:

a display operable to display frames to a user;

a producer processing unit operable to generate frames for display on the display;

a display processor operable to provide frames generated by the producer processing unit to the display for display; and the data processing system further comprising a light output selection circuit configured to:

determine a visual characteristic of a user viewing the frame on the display;

select the amount of a property of the light to be output when displaying the frame on the display based on the determined visual characteristic of the user viewing the frame on the display; and cause the display to output the selected amount of the property of the light when displaying the frame on the display.

As will be appreciated by those skilled in the art, these embodiments of the technology described herein, may, and in an embodiment do, include any one or more or all of the features of the technology described herein described herein.

Thus, for example, the user's visual characteristic that is determined in an embodiment comprises (a measure of) one or more of: the size, shape and/or location of the user's fovea region; the size, shape and/or location of the user's blind spot region; and the user's colour sensitivity (colour blindness). In an embodiment, it comprises the user's colour sensitivity (colour blindness).

The determining of the visual characteristic of the user viewing the frame on the display could comprise actually measuring the user's visual characteristic at the time that the frame is to be displayed on the display, for example by using appropriate test images (e.g. patterns) (or asking the user to input their visual characteristic(s)).

However, in an embodiment comprises retrieving (and then using) stored information indicative of the user's visual characteristic in question. In this case the user's visual characteristic is in an embodiment previously obtained from the user, and/or determined using an appropriate method, for example by using appropriate test images (e.g. patterns), and is then stored and made available for the device that the display is part of, for example by storing it locally on the device, and/or by storing it remotely but in such a manner that it can be retrieved by the device when required.

In this case, the determining of the visual characteristic of the user viewing the frame on the display in an embodiment first comprises identifying the user who is viewing the frame on the display, and then retrieving (and using) the stored information relating to that user's visual characteristic as appropriate. The user could be identified, for example, automatically, e.g. using facial recognition, or could be required to identify themselves to the device, e.g., by the device requesting the identity of the user, e.g. by the user logging in to the device.

The property of the light for which the amount to be output is selected based on the determined visual characteristic(s) of the user, and the way that the display is caused to output the selected amount of light, can be performed in any suitable and desired manner, such as, and in an embodiment, in any one or more or all of the manners discussed above.

Thus the property of light is in an embodiment one (or more) of: the intensity of the light to be output; the luminance level of the light to be output; the brightness of the light (image) to be output; and the colour (e.g. the colour balance) of the light to be output. The property that is selected and adjusted may depend, for example, and in an embodiment, upon the particular visual characteristic or characteristics that are being considered.

In the embodiment where the visual characteristic is the user's colour sensitivity, the property that is selected and set based on the user's visual sensitivity in an embodiment comprises the colour (e.g. the colour balance) of the light to be output when displaying the frame on the display (as discussed above).

In these embodiments of the technology described herein, the selection and setting of the amount of a property of the light to be output can be, and in one embodiment is, set for the display as a whole based on the user's visual characteristic(s). In other embodiments, the property is varied (but still based on the user's visual characteristic(s)) for different regions of the display, for example, and in an embodiment, based on, as discussed above, the location of the user's gaze on the display.

Thus, in an embodiment, these embodiments of the technology described herein also identify the location of the user's gaze on the display (as discussed above), and use that information to further configure the display operation (although, as discussed above, that is not essential, and other embodiments do not use gaze tracking, but, e.g., simply configure the display operation based on the visual characteristics of the identified user, such as, and in an embodiment, their colour sensitivity (colour blindness)).

Other arrangements would, of course, be possible.

Although the technology described herein has been described above with particular reference to the generation and processing of a single frame, as will be appreciated by those skilled in the art, the operation in the manner of the technology described herein is in an embodiment performed for plural frames that are to be displayed, and in an embodiment for each frame of a sequence of plural frames that is to be displayed. Thus, in an embodiment, the operation in the manner of the technology described herein is used when displaying a sequence of plural output frames for display to a user, and correspondingly, the operation in the manner of the technology described herein is in an embodiment repeated for plural output frames being displayed.

For example, for stereoscopic 3D displays, the displaying of the frames may also, accordingly, and in an embodiment, comprise displaying a sequence of "left" and "right" frames to the left and right eyes of the user, respectively. Each pair of "left" and "right" frames for display may be generated from a common input frame, or generated separately, e.g. from respective "left" and "right" input frames, as desired.

It is envisaged that the technology described herein may have particular application to head-mounted displays. Thus, another embodiment of the technology described herein comprises a head-mounted display device comprising the data processing system of any one or more of the embodiments of the technology described herein described herein. Correspondingly, another embodiment of the technology described herein comprises a method of operating a head-mounted display device, comprising operating a head-mounted display device in the manner of any one or more of the embodiments of the technology described herein.

As well as the particular units and components required for operation in the manner of the technology described herein, the data processing system may, and in an embodiment does, also comprise one or more of, and in an embodiment all of, any other suitable and desired component, unit, processor, etc., that a data processing system may comprise. Thus the data processing system may comprise one or more of, and in an embodiment all of: a central processing unit, a host processor, a graphics processing unit, a video processor, an image signal processor, a camera, a system bus, and a memory controller. In an embodiment, the data processing system comprises and/or is in communication with, one or more memories and/or memory devices that store data described herein, and/or software for performing the processes described herein.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, engines, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry), and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages and engines of the technology described herein may be embodied as processing stage circuitry (circuits), e.g., in the form of one or more fixed-function units (hardware) (processing circuitry (circuits)), and/or in the form of programmable processing circuitry (circuits) that can be programmed to perform the desired operation. Equally, any one or more of the processing stages and processing stage circuitry of the technology described herein may be provided as a separate circuit element to any one or more of the other processing stages or processing stage circuitry (circuits), and/or any one or more or all of the processing stages and processing stage circuitry (circuits) may be at least partially formed of shared processing circuitry.

It will also be appreciated by those skilled in the art that all of the described embodiments of the technology described herein can, and in an embodiment do, include, as appropriate, any one or more or all of the features of the technology described herein described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

The present embodiments relate to the displaying of frames to users on a display in a data processing system, such as on the display of an electronic device.

Figure 2:
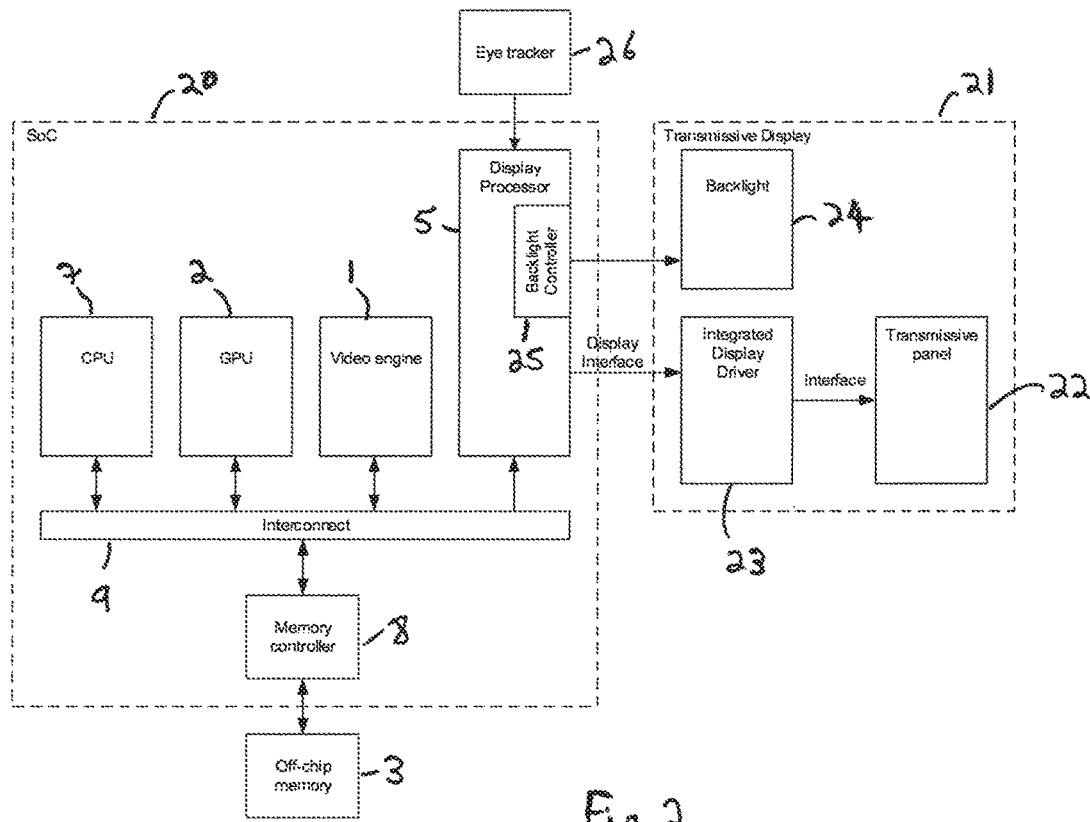
FIG. 2 shows a first embodiment of a data processing system that can be operated in accordance with the technology described herein.

A first embodiment of a data processing system that may be operated in the manner of the technology described herein is shown in FIG. 2.

As can be seen from FIG. 2, this embodiment has similarities and is essentially configured in the same way as the data processing system shown in FIG. 1. Thus, in particular, the data processing system of this embodiment comprises a system on-chip 20 comprising a central processing unit (CPU) 7, a graphics processing unit (GPU) 2, a video engine (codec) 1, a display processor (display processing unit (DPU)) 5, and a memory controller 8, that communicate via an interconnect 9 and have access to an off-chip memory 3.

The system on-chip 20 is in communication with an associated display 21 via a wired or wireless connection to the display processor 5.

In this embodiment, the display 21 is in the form of a transmissive display, and so comprises a transmissive display panel 22, that is coupled to a display driver 23 that is driven by the display processor 5 to display frames on the panel 22, and a backlight 24 whose output is controlled by means of a backlight controller 25 that is part of the display processor 5. The backlight controller could also be a separate component (unit) of the system on-chip 20, rather than being integrated into the display processor 5 as shown in FIG. 2, if desired.

In this embodiment, and in accordance with the technology described herein, and as shown in FIG. 2, the display processor 5 also receives as an input eye tracking information from an eye (gaze) tracking circuit 26 that is operable to track the location of the gaze of the user on the panel 22 of the display 21.

In this system, and as discussed above in relation to FIG. 1, the GPU 2, video engine 1 and/or CPU 7 will generate frames (images) to be displayed and the display processor will then provide those frames to the display 21 for display. The frames may be provided to the display processor 5 from the frame producer (e.g. GPU 2, video engine 1 or CPU 7) via storage in the memory 3, or they may also or instead be streamed to the display processor 5 from the producer processing unit, e.g. through a cache, if desired.

As will be discussed further below, the display processor 5 uses eye tracking information from the eye tracker 26 to control the operation of the backlight 24 of the display 21.

In this case, it is assumed that the output of the backlight 24 can be varied over the area of the display panel 22, such that different regions of the panel 22 can be subjected to different backlighting intensities when displaying a frame on the display 21.

The eye tracker 26 is operable to track the location of the gaze of a user on the display panel 22 when viewing frames that are being displayed on the display panel 22. The eye tracker 26 can do this in any suitable and desired manner, such as by using a camera or cameras to take images of the user's eye or eyes and thereby track the direction of the user's gaze and thus the location of the user's gaze on the display panel.

Figure 3:
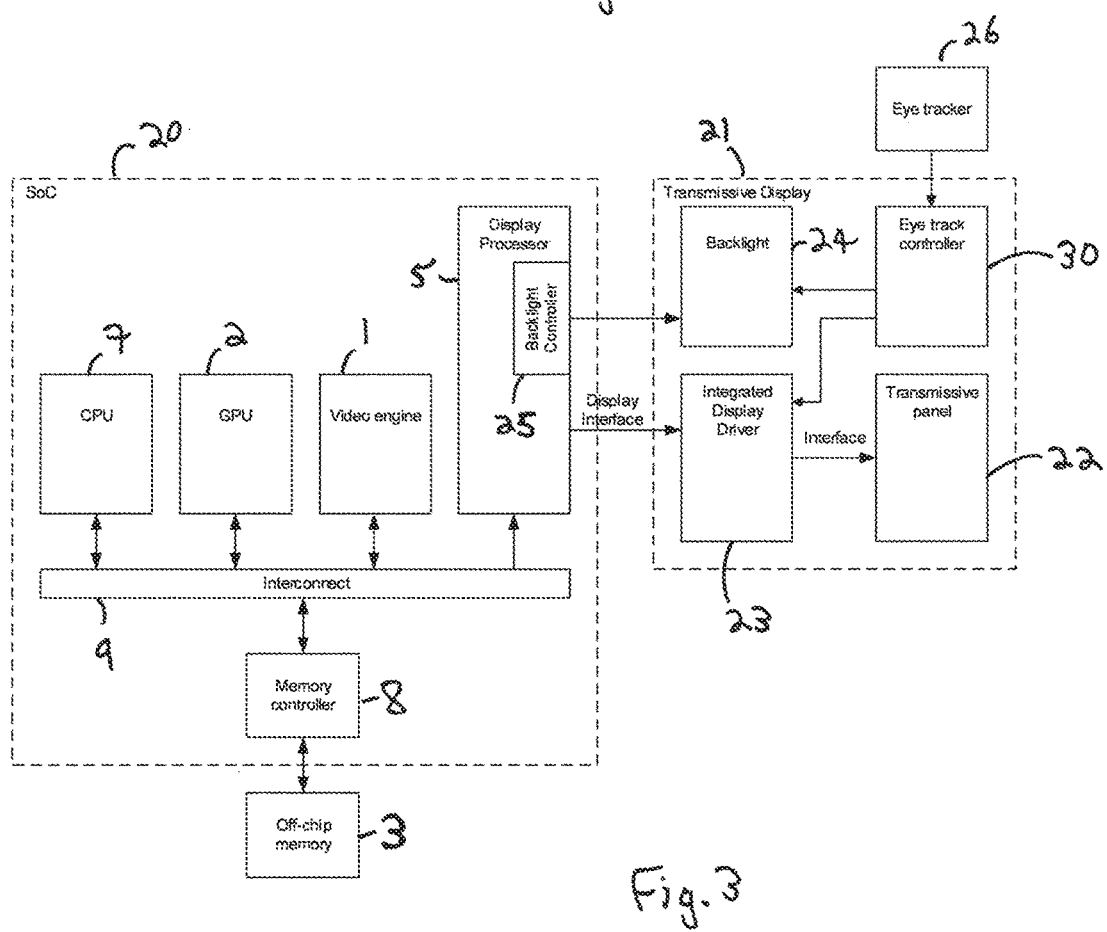
FIG. 3 shows a second embodiment of a data processing system that can be operated in accordance with the technology described herein.

FIG. 3 shows a second embodiment of a data processing system that can be operated in the manner of the technology described herein. This embodiment is similar to the embodiment shown in FIG. 2, and thus uses a transmissive display 21, but in this case, as shown in FIG. 3, the display 21 itself includes an eye tracking controller 30 that receives the eye tracking data from the eye tracker 26 and then uses that data to control the backlight 24 and the display of the frame on the panel 22, rather than the display processor 5 performing that control.

Figure 4:
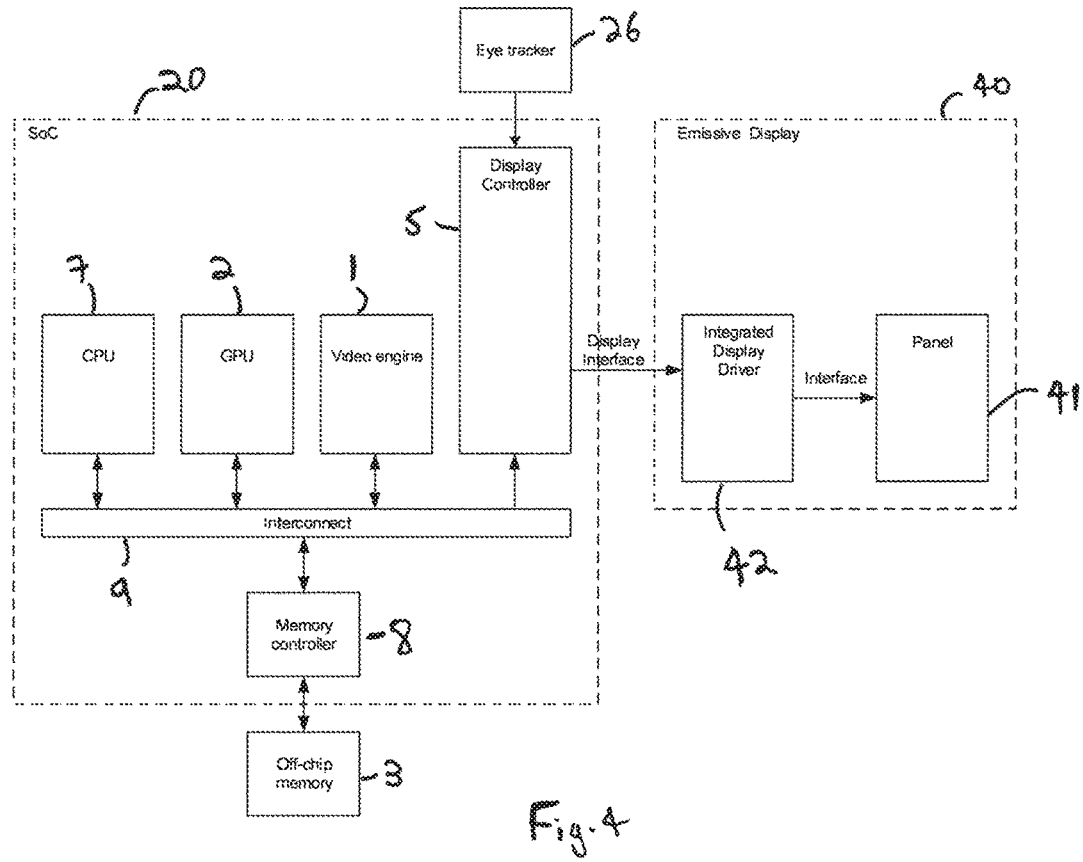
FIG. 4 shows a third embodiment of a data processing system that can be operated in accordance with the technology described herein.

FIG. 4 shows a further embodiment of a data processing system that may be operated in the manner of the technology described herein. Again, as can be seen from FIG. 4, this data processing system is similar to the data processing system shown in FIGS. 2 and 3, but in this case the display 40 is in the form of an emissive display, i.e. such that the light output from the display is generated by the pixels of the display panel 41 directly. This being the case, and as shown in FIG. 4, the display 40 does not include a backlight (and the display controller correspondingly does not perform any control of a display backlight).

FIG. 4 shows the eye tracker 26 providing its eye tracking data to the display controller 5 for use by the display controller to then control the display of frames on the display based on that eye tracking information (as will be discussed in more detail below), in a similar manner to the arrangement shown in FIG. 2 for a transmissive display.

Figure 5:
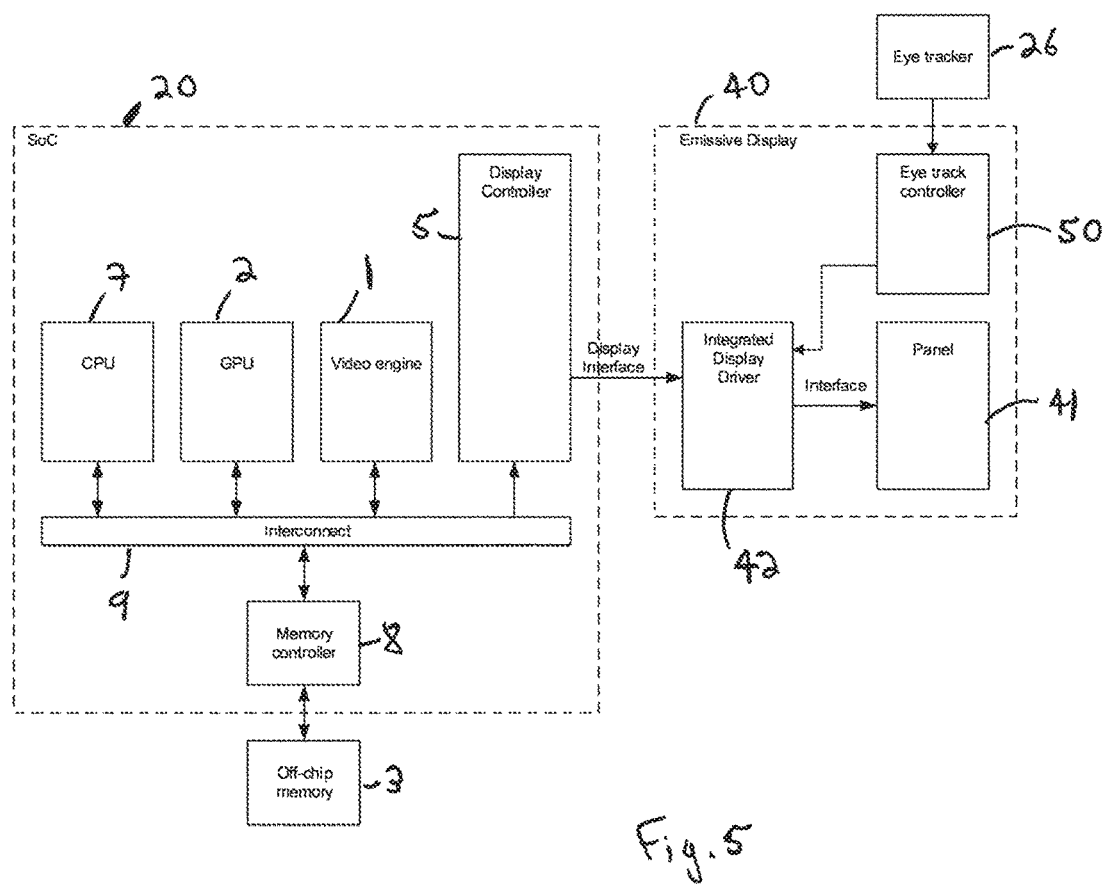
FIG. 5 shows a fourth embodiment of a data processing system that can be operated in accordance with the technology described herein.

FIG. 5 shows a further embodiment that again has an emissive display 40, that is similar to the embodiment shown in FIG. 4, but in this case the eye tracking information and the control of the display of the frames based on the eye tracking information is performed, as shown in FIG. 5, by an eye tracking controller 50 of the display itself (rather than by the display controller 5), in a similar arrangement to the embodiment shown in FIG. 3.

In these embodiments the respective displays 21, 40 may be a display or displays of an electronic device, such as a phone or tablet or a monitor of a computer, that the data processing system is part of. They could also comprise an appropriate head-mounted display system, such as for an augmented reality (AR) or virtual reality (VR) display.

In the latter case, the head-mounted display may include, inter alia, a display screen or screens (panel or panels) for displaying frames to be viewed to a user wearing the head-mounted display, one or more lenses in the viewing path between the user's eyes and the display screens, and one or more sensors for tracking the pose of the user's head (their head position and/or their view (gaze) direction) in use (while images are being displayed on the display to the user).

Figure 6:
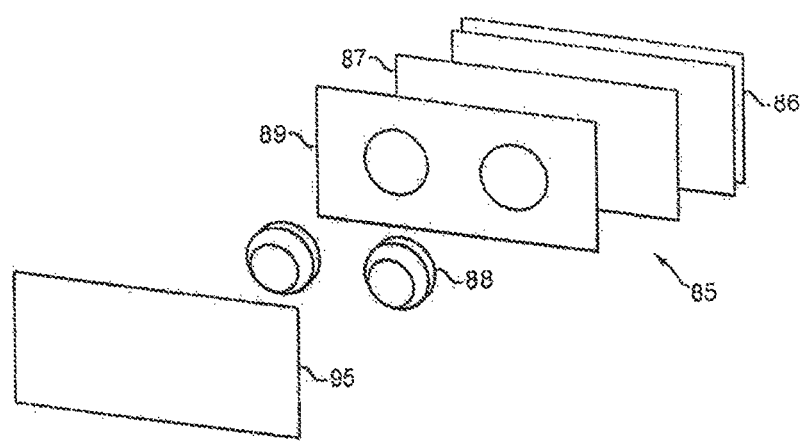
FIG. 6 shows schematically an exemplary head mounted display headset.

FIG. 6 shows schematically an exemplary head-mounted display 85 that may be used in embodiments of the technology described herein. As shown in FIG. 6, the head-mounted display 85 comprises, for example, an appropriate display mount 86 that includes one or more head pose tracking sensors, to which a display screen (panel) 87 is mounted. A pair of lenses 88 are mounted in a lens mount 89 in the viewing path of the display screen 87. Finally, there is an appropriate fitting 95 for the user to wear the headset.

In the present embodiments, the eye tracker 26 operates to track the position of the user's gaze on the panel of the display, and that information is then used to identify and determine a "fovea region" on the display panel that is being gazed by the user's fovea, and, optionally, a blind spot region for the user on the display panel that is being gazed by the user's blind spot. The determination of the fovea region for a user is correspondingly also used to determine a peripheral (non-fovea) region that is being gazed by the periphery (non-fovea) of the user's eye or eyes.

To do this, the eye tracker 26 identifies a fixation point for the user's eye on the display panel (one fixation point is determined for each eye). This may be done in any suitable and desired manner, for example by using a camera to identify the direction of the user's gaze, and information relating to the distance of the user from the panel and the location of the centre of the user's eye and gaze direction, to determine a fixation point of the user's gaze for the or each eye on the display panel.

The so-identified fixation point for each eye provided by the eye tracker 26 is then used to identify the region of the panel that will be gazed by the user's fovea (and thus to identify a "fovea" region on the panel for the or each eye). This may again be done in any suitable and desired manner. For example, the region gazed by the user's fovea may be assumed to be a circular region of a particular size surrounding the identified fixation point, for example based on an assumption about the size of the user's fovea and an estimate of the distance of the user's eye to the display panel.

Correspondingly, a blind spot region for the user may similarly be derived based on known properties of the blind spot of the human eye, such as its location relative to the fovea region and its approximate size (and other properties of the environment in which the display is being used, such as the distance of the user's eye from the display).

Figure 7:
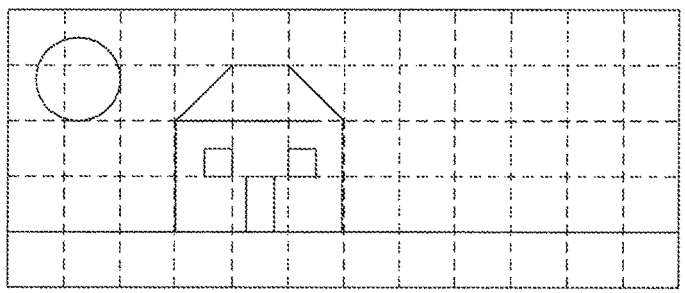
FIGS. 7 and 8 show schematically the determination of fovea regions and blind spot regions when a user is viewing a frame in embodiments of the technology described herein.
Figure 7:
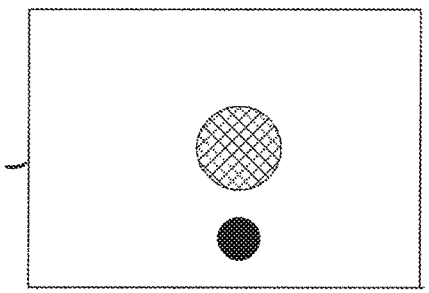
Figure 7:
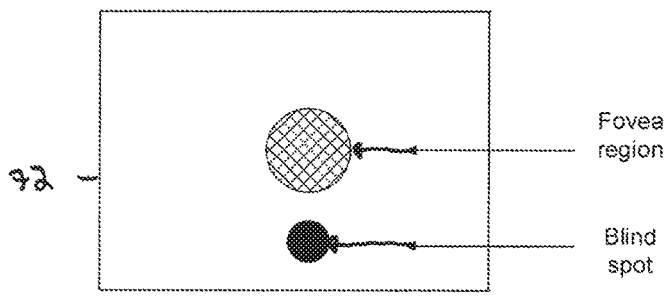
Figure 7:
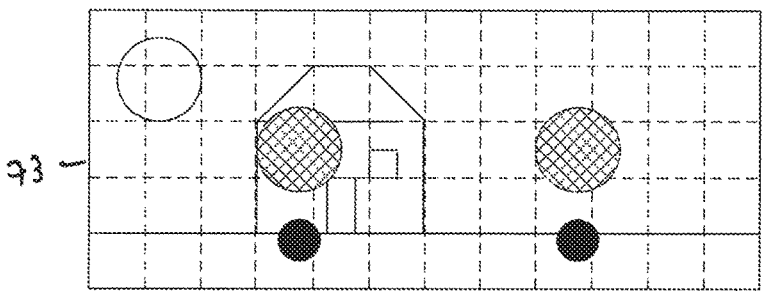
Figure 7:
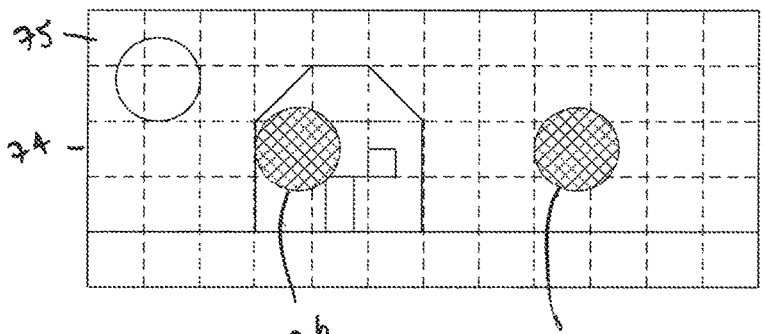

FIG. 7 illustrates this process in the case where the user will be viewing a single frame (image) displayed on a single display panel with both eyes. As shown in FIG. 7, the eye tracker 26 is used to determine the location of a foveal region and a blind spot region on the display 70 for each of the left 71 and right 72 eyes of the user.

FIG. 7 then shows the panel 70 with those foveal regions and blind spots overlaid 73 and the corresponding arrangement 74 where the blind spots are not being treated differently to the periphery region that is outside the fovea region. (It is preferred in this regard that in the case where the user is viewing a single frame being displayed with both eyes, the user's blind spots are not considered, as the blind spot region of one eye will be visible to the other eye, and so it cannot be assumed that the user will not see any of the frame in their blind spot region.)

Figure 8:
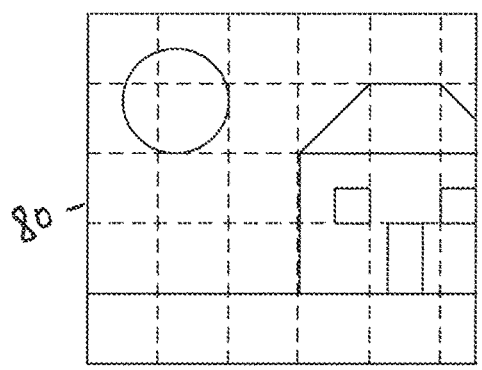
Figure 8:
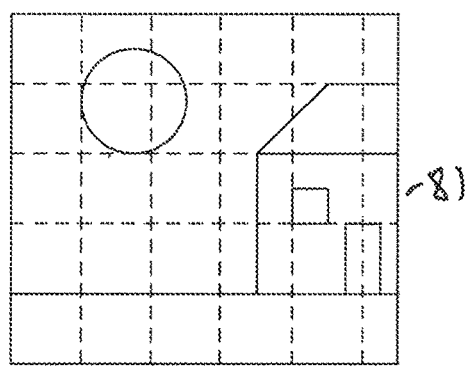
Figure 8:
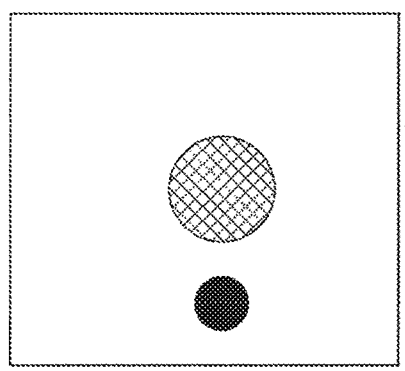
Figure 8:
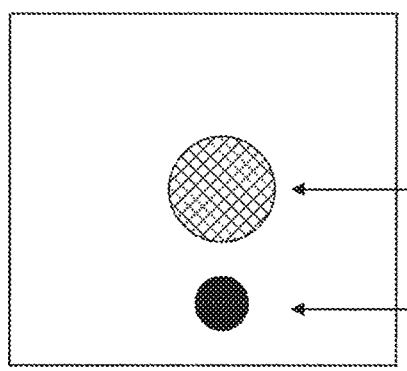
Figure 8:
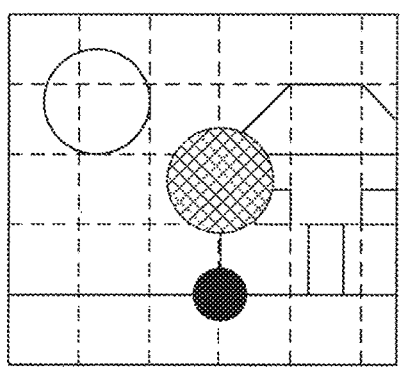
Figure 8:
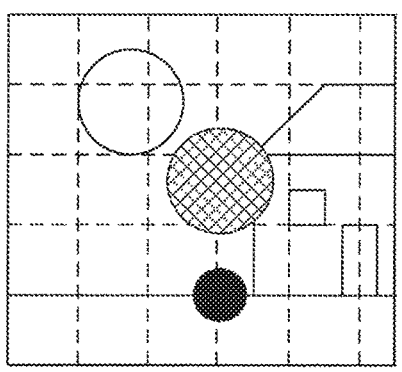

FIG. 8 shows the corresponding situation where each eye is viewing its own respective displayed frame (such as may be the case of a head-mounted display), such that there is respective left eye image 80 being displayed to the left eye and a right eye image 81 being displayed to the user's right eye (which images may be on respective, different display panels, or provided as a display of two frames (side-by-side) on the same panel but such that each eye only sees its own, respective frame).

In this case, as shown in FIG. 8, again respective fovea and blind spot regions will be determined for each eye, and the position of those regions relative to the respective left and right eye frames (images) determined. In this case, it would be possible to take account of the blind spot regions, if desired, as only one of the user's eyes will be looking at a respective image (frame) and so the user will not be able to see anything in that image (frame) in their blind spot region.

Once the fovea region(s) (and optionally the blind spot region(s)) for the user on the display have been determined, then the display of a frame on the display (and in particular the amount of a property or properties of the light that is output when displaying the frame to the user) is controlled, in accordance with the technology described herein, on the basis of the determined fovea (and, optionally, blind spot) region(s) on the display.

Figure 9:
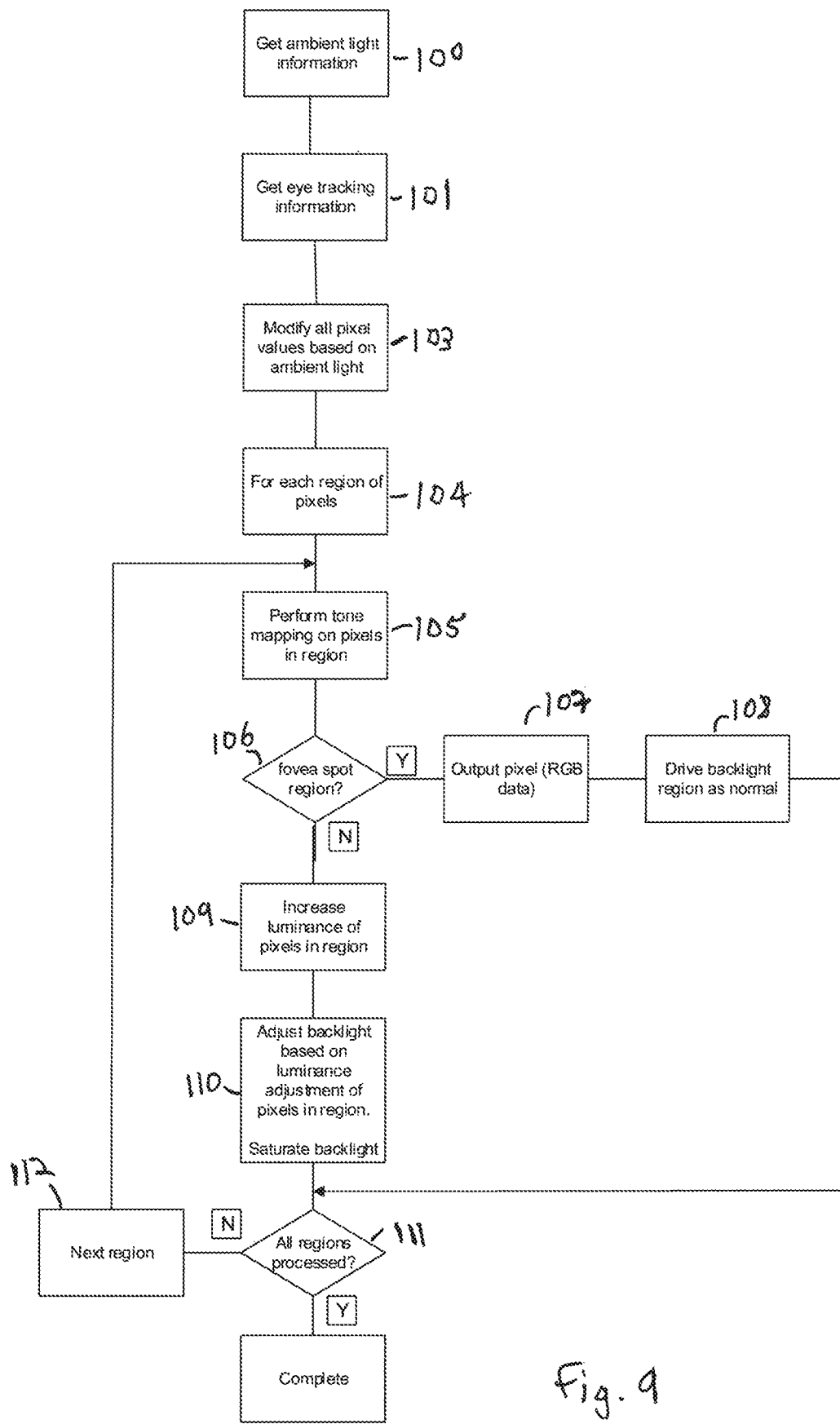
FIG. 9 is a flowchart showing the operation when displaying a frame in one embodiment of the technology described herein.

FIG. 9 shows a first embodiment of this operation in the case where the user is viewing a single display of a frame using both eyes (and so, as discussed above in relation to FIG. 7, only the fovea regions for the user's two eyes are considered, but not any blind spot regions).

As shown in FIG. 9, in this embodiment when a frame is to be displayed, the process starts by obtaining information about the ambient light (which may be determined as desired, e.g. using an appropriate ambient light sensor of the electronic device that the system is incorporated in) (step 100).

The eye tracking information from the eye tracker 26 is then obtained (step 101).

In this embodiment, it is assumed that the control of the operation and of the light output when displaying the frame is done by the display controller (as shown in FIG. 2, for example). As discussed above, it would equally be possible for this operation to be controlled by an appropriate controller 30 of the display itself (as shown in FIG. 3), if desired.

Then, the pixel values to be provided to the display are first modified based on the sensed ambient light (step 103).

The process then considers respective regions of the frame that the frame being displayed has been divided into in turn, and controls the amount of light output (the intensity of the light output) for the region based on whether the region is at least partially within the identified fovea region of one of the user's eyes or not.

In this embodiment, the pixel regions that are considered in this regard correspond to those regions of the display panel for which the backlight output (intensity) can be independently controlled (can be set independently of other regions of the display panel) (the backlight control zones). Such regions can be any suitable and desired size, such as blocks of 16×16 or 32×32 (display) pixels.

As shown in FIG. 9, for each region of pixels (step 104), firstly tone mapping is performed on the pixels of the region (step 105) (if desired). It is then determined whether the region at least partially falls within one of the fovea regions 76, 77 that have been determined for the user on the display (see FIG. 7) (step 106).

If the pixel region falls at least partially within one of the user's fovea regions 76, 77 (that have been identified from the eye tracking information), then the pixel region in question is displayed in the normal manner, thus the pixel data (the RGB data for the pixel) set after the tone mapping is output to the display driver for driving the transmission panel (step 107), and the backlight 24 is correspondingly driven to backlight the pixel region as normal (to the normal level for the required luminance of the pixel region in question) (step 108).

On the other hand, if it is determined that the pixel region being considered falls completely outside one of the determined user fovea regions on the display, then the pixel values in the region are modified so as to increase their relative luminance (step 109), and the backlight for the region in question is adjusted (and in particular its output lowered) based on the luminance adjustment of the pixels in the region and/or to a saturation level (step 110).

In this case it would be possible to change the colours for the pixel region to increase the luminance (brightness), to thereby allow the backlight level to be reduced for a given luminance (this will alter the colours, but this isn't particularly important for the peripheral region), and/or to limit the output brightness (intensity) to a specific maximum level (as the peripheral region will saturate at a lower intensity than the fovea region). In an embodiment both of these operations are performed, in an embodiment by changing the colours to increase the luminance first, and then limiting the brightness to a specific maximum level (if required). Other arrangements would, of course, be possible.

This then has the effect that for those regions of the frame that are outside the determined user's fovea regions, the light output in those regions will be reduced (relative to what was originally intended), thereby reducing the overall light output and power consumption when displaying the frame. (The modification of the pixel values to increase their relative luminance will correspondingly compensate, at least in part, for the reduction in the intensity of backlight output, such that the perceived drop in intensity to the user in the displayed region may be reduced compared to the effect of reducing the backlight output alone.)

This is then repeated for all regions of the frame being displayed (steps 111, 112 and 104).

The process will then be repeated for the next frame to be displayed, and so on, as desired.

Figure 10:
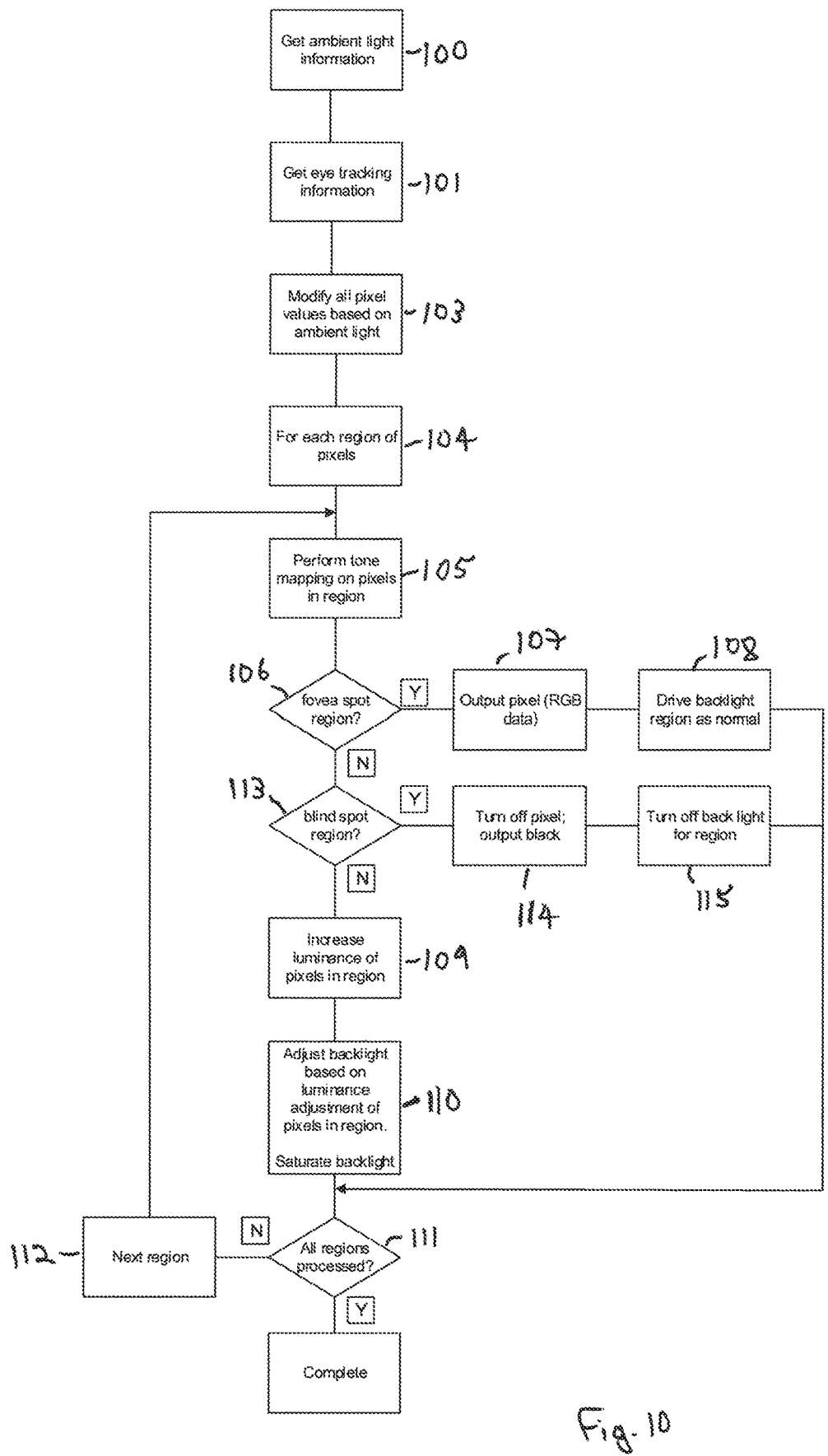
FIG. 10 is a flowchart showing the operation when displaying a frame in another embodiment of the technology described herein.

FIG. 10 shows a second embodiment of the operation in the case of a transmissive display, but in which different, separate images, are displayed to the left and right eyes of the user (as shown in FIG. 8).

In this case therefore the control of the light output when displaying a frame can also, as discussed above, take account of the user's blind spot, and so, as shown in FIG. 10, when processing each region of pixels in the frame being displayed, it is again first determined whether the region falls at least partially within a user's fovea region for the eye in question (and, if it does, as shown in FIG. 10, the pixel data and backlight are output and driven as normal (steps 107 and 108)), but it is then determined whether the pixel region in question falls entirely within a determined blind spot region for the user (step 113).

If it is determined that the pixel region falls entirely within the user's blind spot region on the display panel, then the pixel colours for the region are all set to black (step 114) and the backlight for the pixel region is turned off (step 115) (as the user will not be able to see anything that is displayed in the blind spot region in any event), thereby consuming no power in the pixel region in question.

As shown in FIG. 10, for those frame regions that are not at least partially within the fovea or entirely within the user's blind spot (i.e. that are entirely within "peripheral" regions of the frame from the user's viewing perspective), then the backlight output in those regions is reduced so as to reduce the power consumption, and the pixel values are modified so as to relatively increase their luminance so as to compensate for that (steps 109 and 110) (as shown in, and discussed in relation to, FIG. 9).

Figure 11:
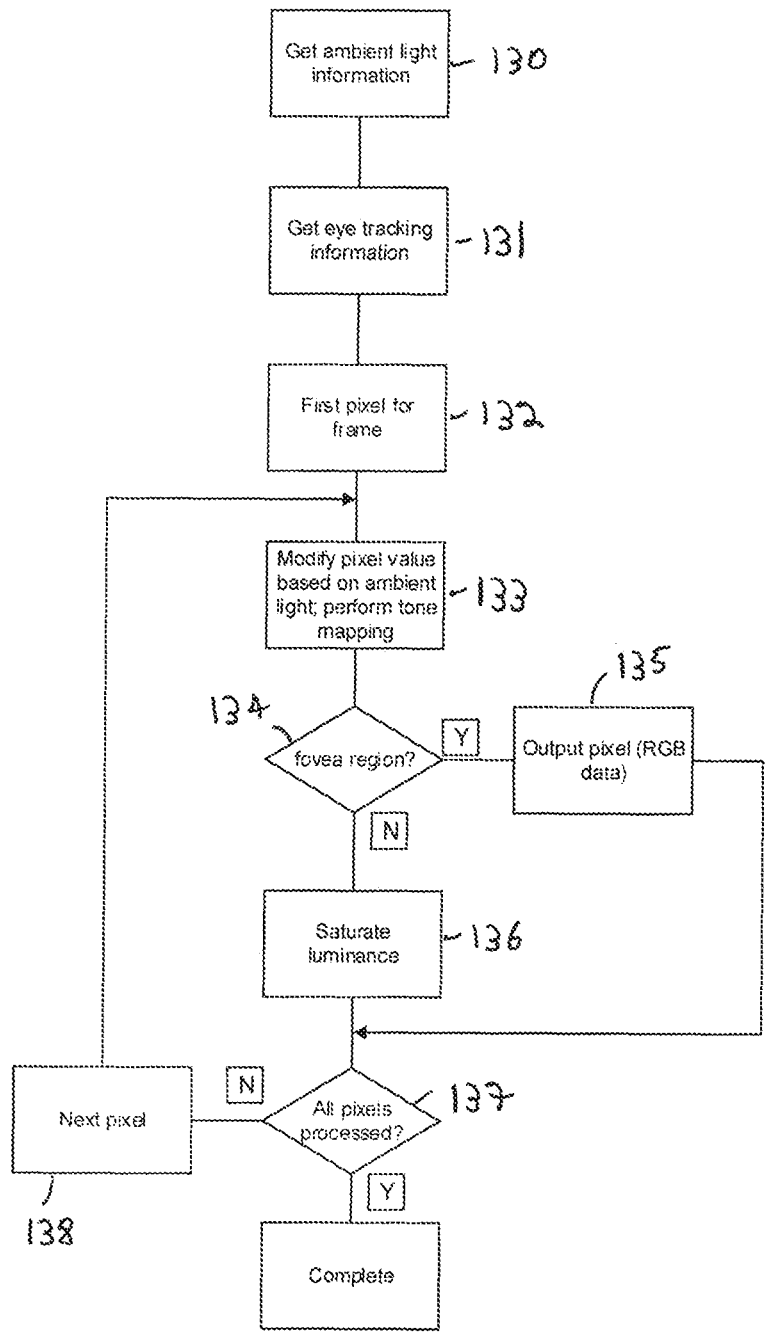
FIG. 11 is a flowchart showing the operation when displaying a frame in a further embodiment of the technology described herein.
Figure 12:
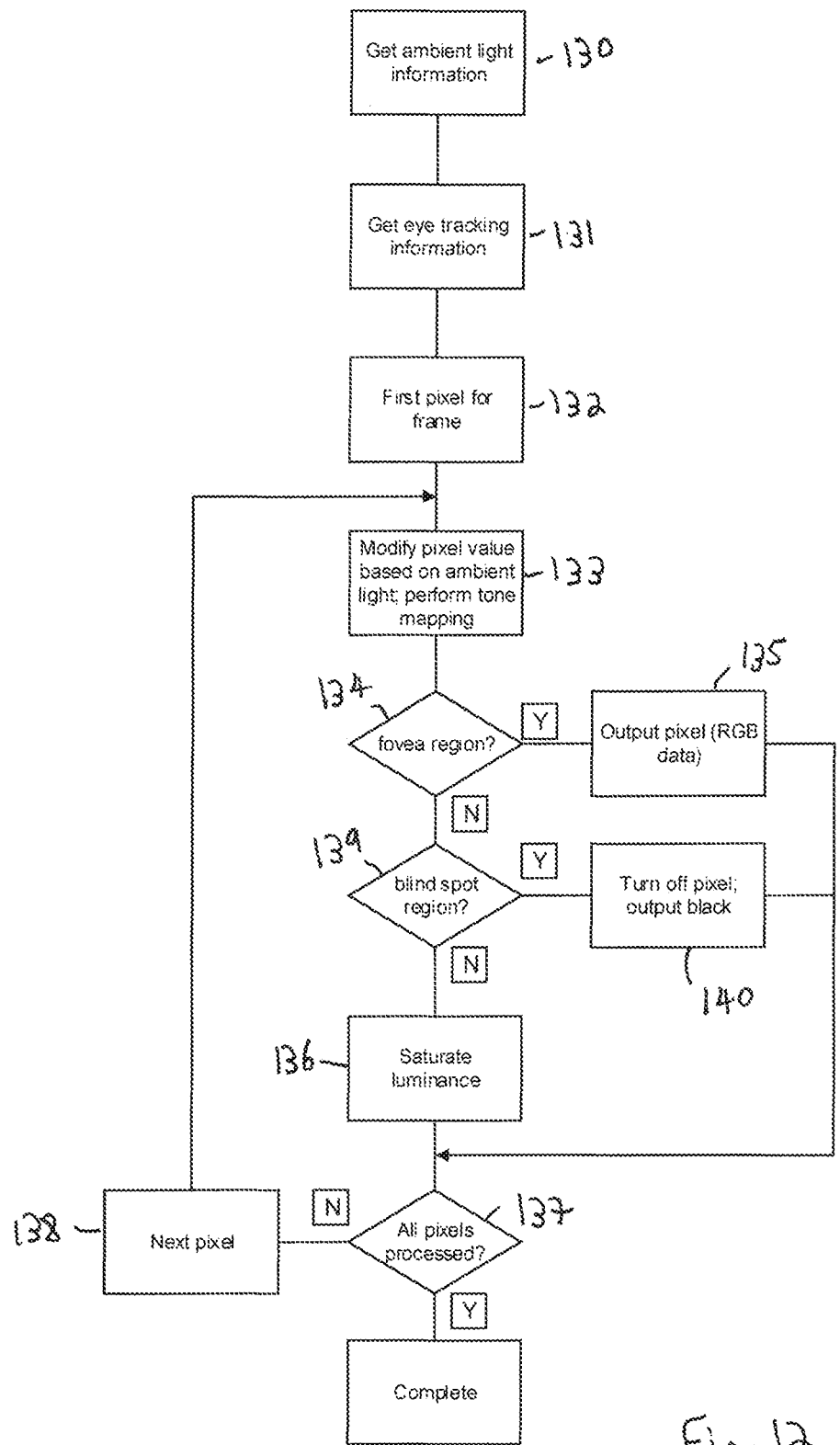
FIG. 12 is a flowchart showing the operation when displaying a frame in a yet further embodiment of the technology described herein.
Figure 13:
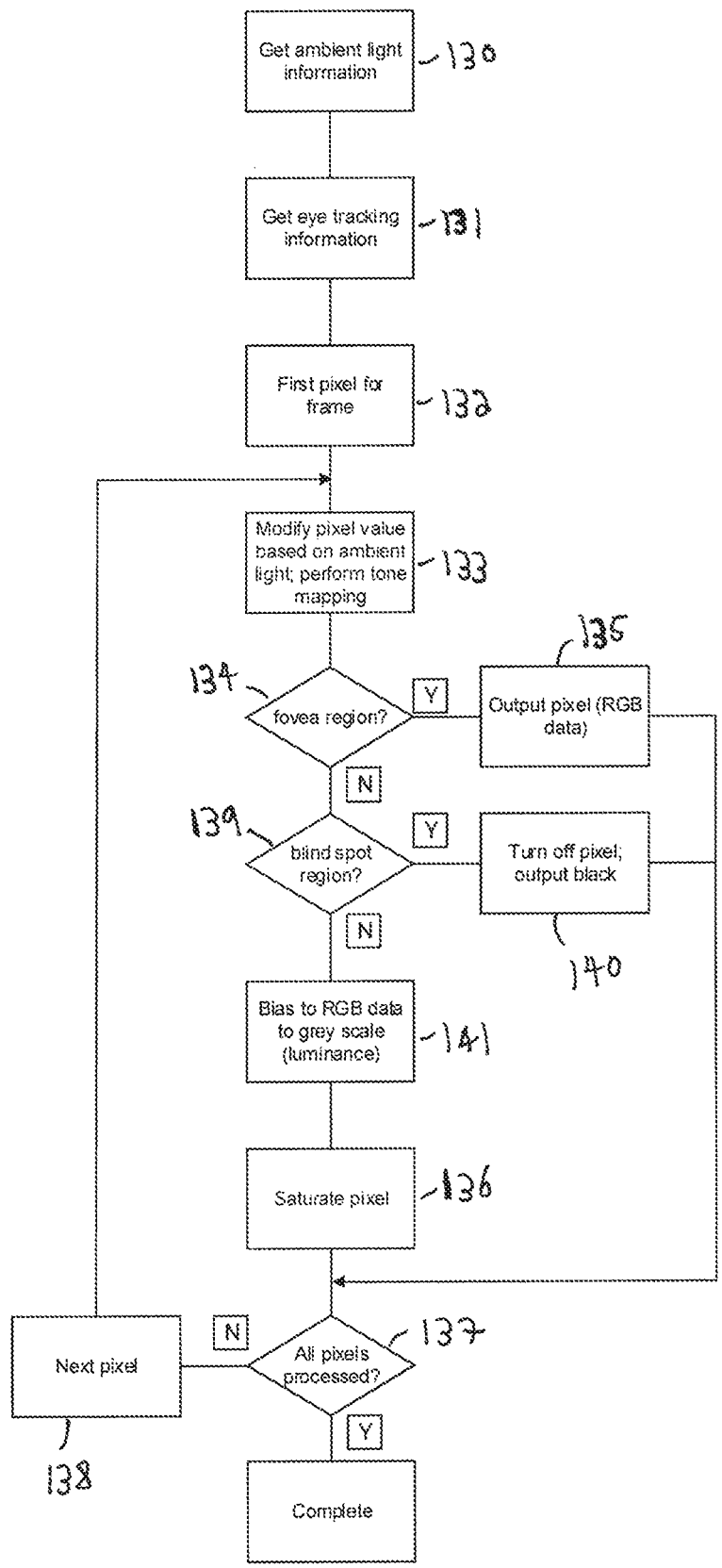
FIG. 13 is a flowchart showing the operation when displaying a frame in yet another embodiment of the technology described herein.

FIGS. 11, 12 and 13 show corresponding embodiments to the operations shown in FIGS. 9 and 10 in the case where the display is an emissive display (thus as shown in FIGS. 4 and 5), such that each individual pixel of the display panel produces its own light output.

In this case, as shown in FIG. 11, rather than considering whether respective pixel regions fall within the user's fovea region (and/or blind spot region) or not, this is done for each individual pixel of the (emissive) display panel.

FIG. 11 shows the arrangement where the user is viewing a single frame being displayed with both eyes, and so the presence of the fovea regions of each of the user's eye on the display is considered, but any blind spot regions are ignored. Thus this embodiment corresponds to the operation for the transmissive display shown in FIG. 9.

In this case, as shown in FIG. 11, the process again starts with the sensing of the ambient light (step 130).

This is then followed by retrieving and using the eye tracking information to identify the fovea regions for the user's eyes on the display (step 131).

Then, for each pixel in the frame being displayed, the pixel value is first modified based on the ambient light and for tone mapping purposes (step 133). It is then determined whether the pixel lies within a determined fovea region of the user (step 134). If so, the display panel pixel is driven to display the pixel using the original pixel value (following its modification based on the ambient light and the tone mapping) (step 135).

On the other hand, if the pixel position is determined to be outside one of the user's fovea regions, then the pixel value is modified so as to saturate the luminance at the pixel in question (to cap the luminance at the pixel in question at a desired maximum level (as discussed above)) and the display panel pixel is driven accordingly (step 136).

This is repeated for all the pixels in the frame to be displayed (steps 137 and 138).

FIG. 12 shows the corresponding operation for an emissive display where it is also considered whether a pixel falls within a determined blind spot region for the user (so in the case, as with FIG. 10, where each eye is viewing a separate displayed frame and so the blind spot region of the user's eye can be taken into account).

In this case, as shown in FIG. 12, when it is determined that the pixel being considered falls within the user's determined blind spot region (at step 139), then the pixel colour is set to black so as to thereby turn off the pixel in question (to cause there to be no output from the display panel for the pixel in question).

The operation of FIG. 12 is otherwise the same as in FIG. 11.

FIG. 13 shows the operation in an embodiment where the display itself gets the eye tracking information and is able to set the pixel values for an emissive display accordingly. It is also assumed in this regard that each display panel pixel includes a white "sub-pixel" (a white colour channel), as well as RGB "sub-pixels" (colour channels). In this case therefore, the display can control the RGB values and the white values for the pixels individually, based on the eye tracking information. (In other arrangements, where the modification of the pixel colours is performed in the display controller, then as the display controller may only be able to transmit RGB or YUV data to the display panel, it may not be possible to control any white "sub-pixels" of the display panel (if present).)

In this case therefore, in a peripheral region, for example, where the eye is less sensitive to colour, the display could decide to reduce or disable the RGB colour output and emphasise or just use the white colour channel output for each pixel, so as to reduce the power consumption by the display in the peripheral regions (so as to favour the luminance output over any colour output).

Thus, in this case, as shown in FIG. 13, when a pixel is determined to be neither in the fovea region or the blind spot region (and so is in the periphery region where a lower light output can be tolerated), as well as saturating the pixel's luminance output level, the RGB data for the pixel is biased to a grayscale display only (step 141) (so as to, in effect, favour maintaining the luminance, rather than the chrominance, display at the pixel in question).

Such biasing of the pixel data to a grayscale could also be used in the case where the blind spot region is not being considered (so in the embodiment shown in FIG. 11, for example) for those pixels that are outside the fovea region, if desired.

The operation of FIG. 13 is otherwise the same as in FIG. 12.

The present embodiments could also, if desired, modify the light to be output for different regions of the display based on the colour sensitivity (blindness) of the user. For example, where a user has a reduced or no sensitivity to a particular colour or colours (e.g. red, green and/or blue), then the output of that colour channel or channels could be, and is in an embodiment, reduced or omitted entirely.

Correspondingly, where the user sees no colour at all, then the display of the frame could be, and is in an embodiment, modified so as to output a monochromatic image. In the case where the display has a white pixel, this could be performed by just using the white pixel. Alternatively, the RGB colour to be displayed could be converted to a luminance level so as to output the appropriate RGB luminance level, but without, and/or with reduced, colour information.

Such colour adjustment is in an embodiment done for both the peripheral and fovea regions.

In these embodiments, the user's colour sensitivity could be set and determined as desired. For example, the user could be asked to input information relating to their colour sensitivity, and/or the user's colour sensitivity could be determined by performing some form of testing of the particular user, with that colour sensitivity information then being stored (locally and/or remotely) for that particular user for use when displaying frames to that user.

The above embodiments all use and base the modification of the display of frames to the user on gaze tracking that identifies where the user is looking at the display. However, the Applicants have recognised that modifications to the display of frames to a user could also be advantageously used and provided in situations where gaze tracking is not necessarily used. For example, in the case where the user is colour blind, the above adjustments for colour blindness (colour sensitivity) when displaying frames to the user could still be performed to reduce display power consumption, for example, even in the case where gaze tracking is not being used.

Thus, in another embodiment, the display of frames to a user is modified based on a visual characteristic or characteristics of the user, without also using gaze tracking.

Figure 14:
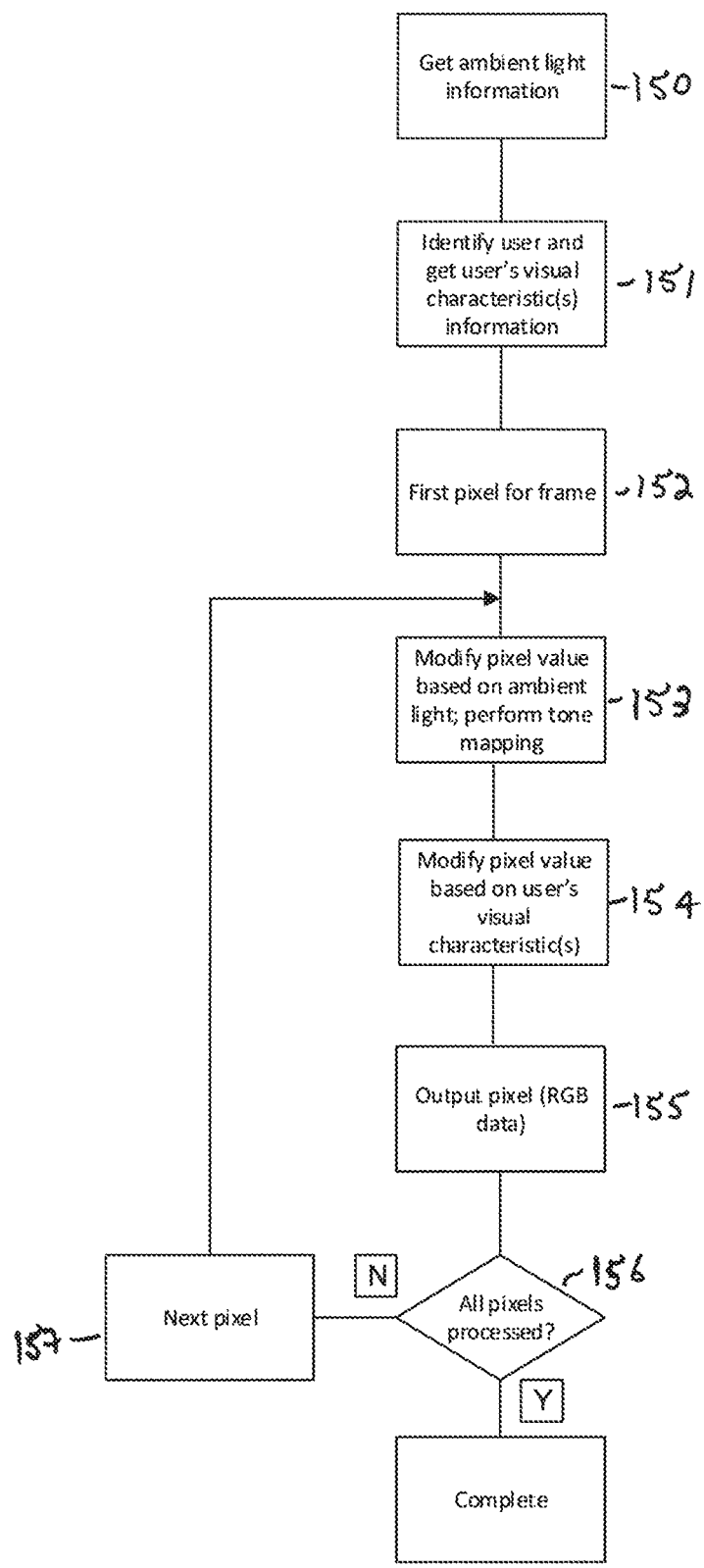
FIG. 14 is a flowchart showing the operation when displaying a frame in yet another embodiment of the technology described herein.

FIG. 14 shows an embodiment of this operation in the case where the display is an emissive display (as shown in FIGS. 4 and 5), such that each individual pixel of the display panel produces its own light output.

In this case, as shown in FIG. 14, the process again starts with the sensing of the ambient light (step 150).

This is then followed by identifying the user who is viewing the display, and retrieving information about one or more visual characteristics of that user based on the identification of the user (step 151).

The user could be identified automatically by the device, for example using some form of facial recognition process, and/or the user could be required to identify themselves to the device, such as the user being required to login to the device.

The information indicative of the user's visual characteristic(s) that is retrieved is, e.g., previously obtained from the user, and/or determined using an appropriate method, and is then stored and made available for the device that the display is part of, for example by storing it locally on the device, and/or by storing it remotely but in such a manner that it can be retrieved by the device when required.

Then, for each pixel in the frame being displayed, the pixel values are first modified based on the ambient light and for tone mapping purposes (step 153).

The pixel value is then modified based on the identified user's visual characteristic(s) (step 154). In the present embodiment, it is assumed that the measured visual characteristic of the user is the user's colour sensitivity (blindness), and so the pixel values will be modified based on the indicated colour sensitivity (blindness) of the user. Thus, where a user has a reduced or no sensitivity to a particular colour or colours, then the output of that colour channel or channels could be, and is in an embodiment, reduced or omitted entirely, or where the user sees no colour at all, then the display of the frame is modified so as to output a monochromatic image.

The modified pixel value is then output and the display panel pixel is driven to display the pixel using that modified pixel value (step 155).

This is repeated for the pixels in the frame to be displayed (steps 156 and 157).

Corresponding arrangements could be used for transmissive displays, and it would also be possible to also track the user's gaze and take account of the user's gaze location, if desired (for example, it would be possible to identify the fovea region of the user using gaze tracking, and modify the display output based on the user's visual characteristics differently for the fovea region to the peripheral region (for example), if desired).

It can be seen from the above that the technology described herein, in its embodiments at least, can provide a visually acceptable display of images to a user whilst reducing the power consumed when displaying those images. This is achieved, in the embodiments of the technology described herein at least, by controlling the light output in different regions of the display based on tracking of the user's gaze on the display.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, the data processing system comprising:
   an emissive display operable to display frames to a user;
   a processing unit operable to generate frames for display on the display;

a display processor operable to provide frames generated by the processing unit to the display for display; and
a gaze tracking system operable to determine a location of a user's gaze on the display;
the method comprising:
when a frame is to be displayed on the display:
determining the location of the user's gaze on the display;
selecting the amount of a property of light to be output for different regions of the display when displaying the frame on the display based on the determined location of the user's gaze on the display; and
causing the display to output the selected amount of the property of the light in the different regions of the display when displaying the frame on the display;
wherein the determined location of the user's gaze on the display is used to identify two regions on the display for which the amount of a property of the light to be output will be selected, a first region on the display that surrounds and includes the determined location of the user's gaze on the display, and a second region that surrounds the identified first region; and
wherein the method comprises causing the display to output a lower amount of a property of the light for the second identified region on the display by modifying color values to be displayed at each pixel of the display in the second identified region of the display so as to bias the color values towards a gray scale output in the second identified region of the display.

2. A data processing system comprising:
an emissive display operable to display frames to a user;
a processing unit operable to generate frames for display on the display;
a display processor operable to provide frames generated by the processing unit to the display for display; and
a gaze tracking system operable to determine a location of a user's gaze on the display;
the data processing system further comprising a light output selection circuit configured to:
select the amount of a property of light to be output for different regions of the display when displaying a frame on the display based on a determined location of the user's gaze on the display; and
cause the display to output the selected amount of the property of the light in the different regions of the display when displaying a frame on the display;
wherein the light output selection circuit is further configured to use the determined location of the user's gaze on the display to identify two regions on the display for which the amount of a property of the light to be output will be selected, a first region on the display that surrounds and includes the determined location of the user's gaze on the display, and a second region that surrounds the identified first region; and
to cause the display to output a lower amount of a property of the light for the second identified region on the display by modifying color values to be displayed at each pixel of the display in the second identified region of the display so as to bias the color values towards a gray scale output in the second identified region of the display.

3. A non-transitory computer readable storage medium storing computer software code which when executing on a processor performs a method of operating a data processing system, the data processing system comprising:

an emissive display operable to display frames to a user;
a processing unit operable to generate frames for display on the display;
a display processor operable to provide frames generated by the processing unit to the display for display; and
a gaze tracking system operable to determine a location of a user's gaze on the display;
the method comprising:
when a frame is to be displayed on the display:
determining the location of the user's gaze on the display;
selecting the amount of a property of light to be output for different regions of the display when displaying the frame on the display based on the determined location of the user's gaze on the display; and
causing the display to output the selected amount of a property of the light in the different regions of the display when displaying the frame on the display;
wherein the determined location of the user's gaze on the display is used to identify two regions on the display for which the amount of a property of the light to be output will be selected, a first region on the display that surrounds and includes the determined location of the user's gaze on the display, and a second region that surrounds the identified first region; and
the method further comprises causing the display to output a lower amount of a property of the light for the second identified region on the display by modifying color values to be displayed at each pixel of the display in the second identified region of the display so as to bias the color values towards a gray scale output in the second identified region of the display.

4. The method of claim 1, wherein the amount of a property of the light to be output for the second identified region of the display is selected so as to reduce a power consumption of the data processing system when displaying the frame, relative to an amount of power that would be consumed by the data processing system when displaying the frame without selecting the amount of light to be output for the different regions of the display based on the determined location of the user's gaze on the display.

5. The method of claim 1, further comprising causing the display to favor light output in terms of a luminance of each pixel in the second region of the display at expense of chrominance output of said pixels, so as to reduce a power consumption of the data processing system when displaying the frame relative to an amount of power that would be consumed by the data processing system when displaying the frame without selecting the amount of light to be output for the different regions of the display based on the determined location of the user's gaze on the display.

6. A method of operating a data processing system, the data processing system comprising:
a transmissive display operable to display frames to a user;
a processing unit operable to generate frames for display on the display;
a display processor operable to provide frames generated by the processing unit to the display for display; and
a gaze tracking system operable to determine a location of a user's gaze on the display;
the method comprising:
when a frame is to be displayed on the display:
determining the location of the user's gaze on the display;

selecting the amount of a property of light to be output for different regions of the display when displaying the frame on the display based on the determined location of the user's gaze on the display; and causing the display to output the selected amount of a property of the light in the different regions of the display when displaying the frame on the display;

wherein the determined location of the user's gaze on the display is used to identify two regions on the display for which the amount of a property of the light to be output will be selected, a first region on the display that surrounds and includes the determined location of the user's gaze on the display, and a second region that surrounds the identified first region; and the method comprises causing the display to output the selected amount of a property of the light in the second identified region of the display by setting a backlight output intensity in the second identified region of the display so as to cause the display to output a reduced amount of light in the second identified region of the display.

7. The method of claim 6, wherein the amount of a property of the light to be output for the second identified region of the display is selected so as to reduce a power consumption of the data processing system when displaying the frame, relative to an amount of power that would be consumed by the data processing system when displaying the frame without selecting the amount of light to be output for the different regions of the display based on the determined location of the user's gaze on the display.

8. A data processing system comprising:
an emissive display operable to display frames to a user;
a processing unit operable to generate frames for display on the display;
a display processor operable to provide frames generated by the processing unit to the display for display; and
a gaze tracking system operable to determine a location of a user's gaze on the display;

the data processing system further comprising a light output selection circuit configured to:
select the amount of a property of light to be output for different regions of the display when displaying a frame on the display based on a determined location of the user's gaze on the display; and
cause the display to output the selected amount of the property of the light in the different regions of the display when displaying a frame on the display;
wherein the light output selection circuit is further configured to use the determined location of the user's gaze on the display to identify two regions on the display for which the amount of a property of the light to be output will be selected, a first region on the display that surrounds and includes the determined location of the user's gaze on the display, and a second region that surrounds the identified first region; and
to cause the display to output the selected amount of a property of the light in the second identified region of the display by setting a backlight output intensity in the second identified region of the display so as to cause the display to output a reduced amount of light in the second identified region of the display.

9. The method of claim 1, wherein the step of selecting the amount of a property of light to be output for different regions of the display when displaying the frame on the display based on the determined location of the user's gaze on the display is performed by the display processor or by the display.

10. The method of claim 6, wherein the step of selecting the amount of a property of light to be output for different regions of the display when displaying the frame on the display based on the determined location of the user's gaze on the display is performed by the display processor or by the display.

* * * * *